United States Patent [19]
Aroyan et al.

[11] Patent Number: 6,163,313
[45] Date of Patent: Dec. 19, 2000

[54] TOUCH SENSITIVE SCREEN AND METHOD

[76] Inventors: James L. Aroyan, 3230 Mission Dr., Santa Cruz, Calif. 95065; Paulo Irulegui Gomes, 127 Lee St., Santa Cruz, Calif. 95060; Joel Kent, 35937 Gaskell Ct., Fremont, Calif. 94536

[21] Appl. No.: 08/989,928

[22] Filed: Dec. 12, 1997

[51] Int. Cl.⁷ .................................................. G09G 5/00
[52] U.S. Cl. ...................... 345/173; 345/177; 178/18.04; 178/18.05
[58] Field of Search ..................................... 345/173, 177; 178/18.05, 18.04, 18.06; 341/33; 707/535

[56] References Cited

U.S. PATENT DOCUMENTS

| | | |
|---|---|---|
| 3,798,370 | 3/1974 | Hurst . |
| 4,220,815 | 9/1980 | Gibson et al. .............................. 178/18 |
| 4,293,734 | 10/1981 | Pepper, Jr. ................................ 178/18 |
| 4,371,746 | 2/1983 | Pepper, Jr. ................................ 178/18 |
| 4,493,104 | 1/1985 | Lukis et al. ............................... 382/13 |
| 4,661,655 | 4/1987 | Gibson et al. ............................ 178/18 |
| 4,725,695 | 2/1988 | Murdock et al. ......................... 178/18 |
| 4,731,508 | 3/1988 | Gibson et al. ............................ 178/18 |
| 4,777,328 | 10/1988 | Talmadge, Jr. et al. ................... 178/18 |
| 4,797,514 | 1/1989 | Talmadge, Jr. et al. ................... 178/18 |
| 4,822,957 | 4/1989 | Talmadge, Jr. et al. ................... 178/18 |
| 5,041,701 | 8/1991 | Wolfe et al. .............................. 178/18 |
| 5,045,644 | 9/1991 | Dunthorn ................................. 178/18 |
| 5,220,136 | 6/1993 | Kent ......................................... 178/18 |
| 5,736,688 | 4/1998 | Barrett et al. ............................. 178/20 |
| 5,804,773 | 9/1998 | Wilson et al. ............................. 178/19 |
| 5,815,141 | 9/1998 | Phares ...................................... 345/173 |
| 5,869,791 | 2/1999 | Young ...................................... 178/20.01 |

FOREIGN PATENT DOCUMENTS

WO 87/04553    7/1987    WIPO .......................... G08C 21/00

*Primary Examiner*—Dennis-Doon Chow
*Assistant Examiner*—Amr Awad

[57] ABSTRACT

A position touch sensor having a substrate and a resistive layer disposed on the substrate. At least one pair of electrodes is positioned on the resistive layer. A portion of one electrode is spaced from a portion of another electrode to produce an overlapped resistive region between the spaced portions of the electrodes. An insulating region extends into and terminates in the overlapped resistive region from a resistive region of the resistive layer outside the overlapped resistive region. A method for controlling the flow of current through a resistive layer for converting physical position information on the resistive layer into electrical signals. The method includes determining a dimension of a length of a generally continuous resistive section which is to be located in the resistive layer. The dimension of the length is determined through the use of electrical excitation in the resistive layer. A first insulating region is disposed in the resistive layer to form a first boundary of the generally continuous resistive section. Subsequently and at a distance from the first insulating region essentially equaling the dimension of the length, a second insulating region is disposed in the resistive layer to form a second boundary of the generally continuous resistive section such that current may be conducted through the generally continuous resistive section between the first and second insulating regions.

23 Claims, 11 Drawing Sheets

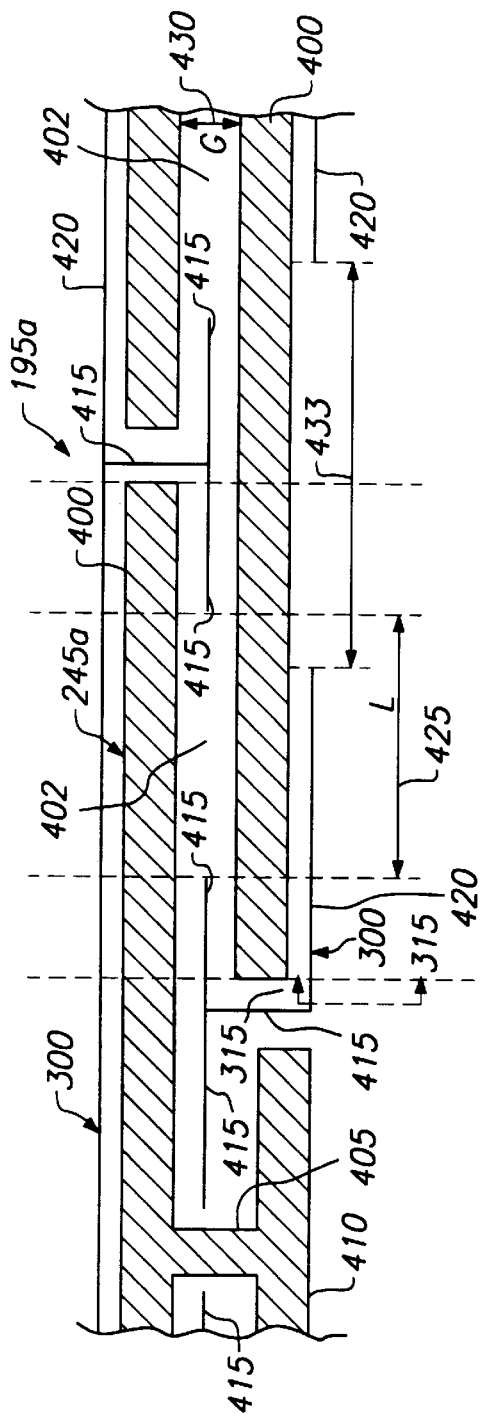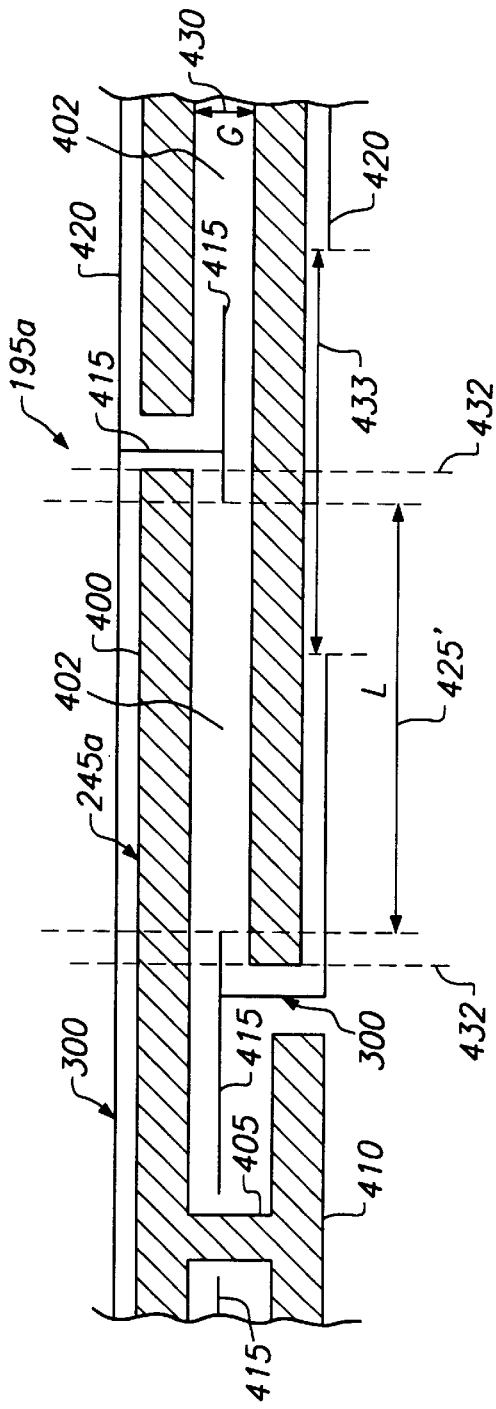

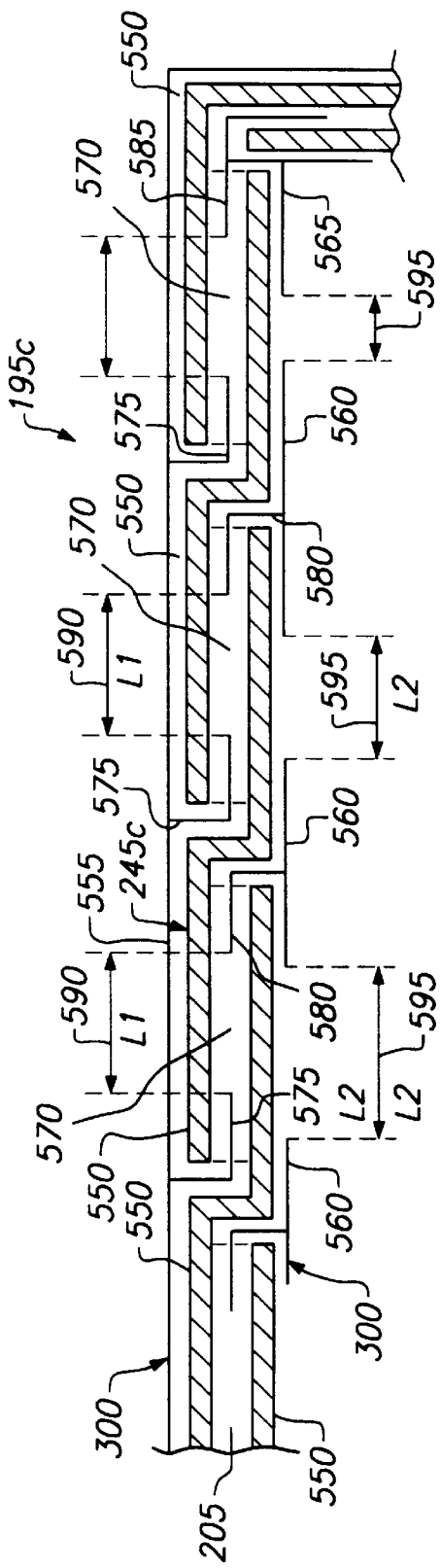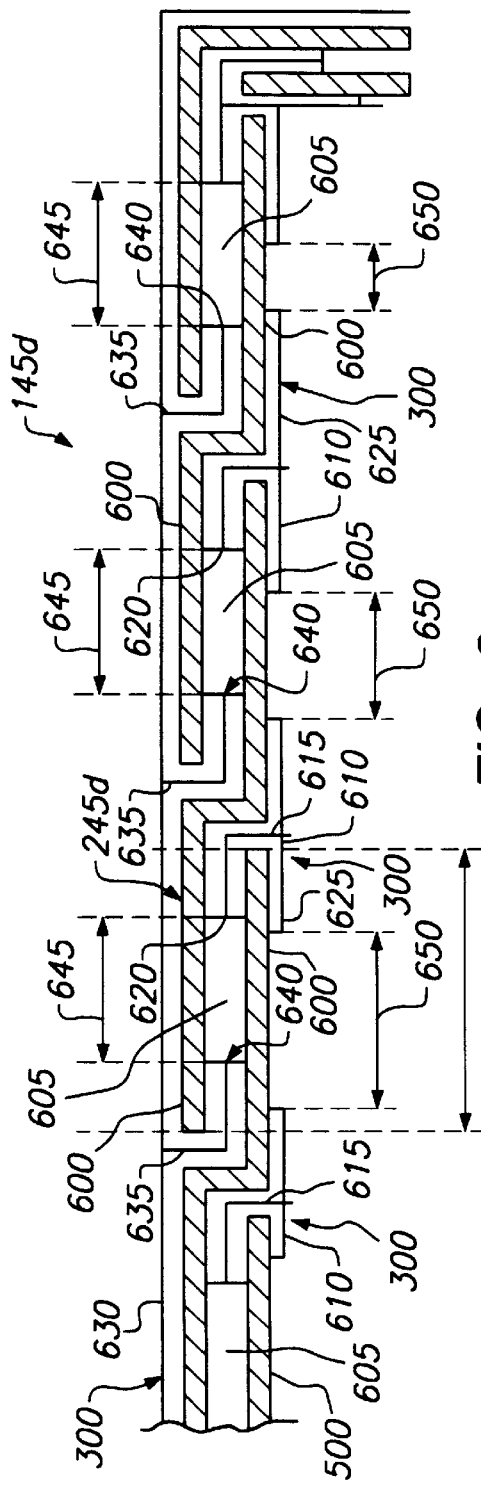

TOUCH SENSITIVE SCREEN AND METHOD

BACKGROUND OF THE INVENTION

1. Field of the Invention

The present invention relates to devices for inputting or determining the coordinates (i.e., X and Y coordinates) of a location in a two-dimensional system such as touch sensitive screens for producing output signals related to a touched position. The present invention more particularly provides a resistive touch sensor whereby coordinates of a location can be selected or determined with excellent linearity throughout an increased proportion of the area of the resistive touch sensor. The present invention also more particularly provides a method for producing a touch sensitive screen having reduced bow, or reduced variation of bow, of equipotential field lines therein by selectively modifying the resistance characteristics of a resistive layer on a substrate or gradient sheet.

2. Description of the Prior Art

Touchscreens are becoming the computer input device of choice for an increasing variety of applications. A touchscreen is a transparent input device that can sense the two-dimensional position of the touch of a finger or other electronically passive stylus. Touchscreens are placed over display devices such as cathode-ray-tube monitors and liquid crystal displays. In this manner, touch display systems are provided for many applications including restaurant order entry systems, industrial process control applications, interactive museum exhibits, public information kiosks, lap-top computers used during sales calls, etc.

Many schemes have been proposed for touchscreen construction, some of which have met with commercial success. Presently, the dominant touch technologies are 4-wire resistive, 5-wire resistive, capacitive, and ultrasonic. These are technologies that have delivered high standards of performance at cost-competitive prices. Only technologies that can keep pace with downward price pressures will retain a major market share in the future.

5-wire resistive touchscreens, e.g. the AccuTouchTM product line of Elo TouchSystems, Inc. of Fremont, Calif., have been widely accepted for many touchscreen applications. In these touchscreens, mechanical pressure from a finger or stylus causes a plastic membrane coversheet to flex and make physical contact with an underlying glass substrate. The glass substrate is coated with a resistive layer upon which voltage gradients are excited. Via electrical connections to the four corners of the coated glass substrate, associated electronics can sequentially excite gradients in both the X and Y directions. The underside of the coversheet has a conductive coating which provides an electrical connection between the touch location and voltage sensing electronics. Note that there are a total of five electrical connections, i.e., "5 wires", between the touchscreen and the controller electronics. Further details regarding 5-wire resistive touchscreens are found in the following: U.S. Pat. No. 4,220,815 to Gibson; U.S. Pat. Nos. 4,661,655 and 4,731,508 to Gibson et al.; U.S. Pat. No. 4,822,957 to Talmadge et al.; U.S. Pat. No. 5,045,644 to Dunthorn; and U.S. Pat. No. 5,220,136 to Kent, all fully incorporated herein by reference thereto as if repeated verbatim hereinafter.

Manufacturing costs for 4-wire resistive touchscreens are less than for 5-wire resistive touchscreens. 4-wire resistive touchscreens dominate the low-end touch market. However, in applications demanding reliable performance in the face of heavy use, the 5-wire resistive technology has proven to be superior. To measure both X and Y coordinates, 4-wire resistive touchscreens alternate between exciting a voltage gradient on the substrate resistive coating and exciting an orthogonal voltage gradient on the coversheet coating. Performance of 4-wire touchscreens degrade as the uniform resistivity of the coversheet coating is lost as a result of mechanical flexing. This is not a problem for 5-wire touchscreens where both X and Y voltage gradients are generated on the substrate's resistive coating, and the coversheet coating need only provide electrical continuity. However, in a 5-wire touchscreen, a peripheral electrode pattern of some complexity is required to enable sequential generation of both X and Y voltage gradients on the same resistive coating. This is a major reason why the manufacture of 5-wire touchscreens is more costly than the manufacture of 4-wire touchscreens. There is a need to minimize the manufacturing cost of the peripheral electrode pattern.

5-wire resistive touchscreens also compete with non-resistive touch technologies such as ultrasonic touchscreen technology. A performance advantage of the 5-wire touchscreens is their high touch sensitivity for a sharp-tipped passive stylus such as a long fingernail or the corner of a credit card. In contrast, a disadvantage of 5-wire touchscreens is their reduced optical transmission relative to, e.g. an ultrasonic touchscreen. In the design of successful 5-wire resistive touchscreen products, significant attention is given to preserving as much as possible the clarity of the displayed image viewed through the touchscreen. In particular, it is essential that the electrically conductive resistive coatings have high transparency.

A transparent conductive coating is almost an oxymoron. A conductive material is one in which electrons (or holes) are free to move in response to electric fields. A transparent material is one in which electrons are not free to move in response to the electric fields of light radiation. Free electrons reflect light. That is why metals look "metallic." Of great commercial importance is the fact that, due to intricate quantum-mechanical effects, degenerate semi-conductors such as indium tin oxide (ITO) and antimony tin oxide (ATO) provide a means to produce transparent conductive films. We look through degenerate semi-conductors daily when we view liquid crystal displays on digital wristwatches, lap-top computer displays, etc.

Like liquid crystal displays, resistive touchscreens owe their existence as commercially viable products to the quantum mechanics of degenerate semi-conductors. No other material is so well suited to play the role of a transparent resistive coating on a 5-wire touchscreen substrate. 5-wire touchscreen designs of commercial interest must be compatible with the materials and manufacturing processes of degenerate semi-conductors such as ITO.

In the assembly of a 5-wire resistive touchscreen, the most costly component is the substrate, typically about 1.0 mm to about 3.0 mm thick glass, on which has been applied the resistive coating, typically ITO, as well as a peripheral electrode pattern. The peripheral electrode pattern forms a resistor network which is powered at the four corners by excitation voltages from the controller electronics. In turn, the electrode pattern excites voltage gradients in the ITO corresponding to the touchscreen active area. A key to the commercial success of 5-wire resistive touchscreens has been the effort to minimize the cost of this coated and patterned substrate component. Further cost reductions are needed to maintain the competitive position of 5-wire resistive touchscreens.

The substrate design includes conductive traces which connect the four corners of the electrode pattern to a group of soldering pads where a simple five-wire ribbon cable is connected. This reduces the cost of the fully assembled touchscreen by eliminating the need for a complex cable harness and wire routing. A screen-printed silver frit has proven to be the material of choice for these traces due to its high conductivity, durability, and its ability to accept solder connections. Analogous to the plastic insulation of a copper wire, these silver-frit traces are isolated by nearby insulating regions of bare glass substrate. Hence the glass substrate has conductive regions upon which silver frit has been sintered, insulating regions of bare glass, and resistive regions coated with ITO.

Inspection of substrates of commercial products reveals an impressive economy of design in the peripheral electrode pattern. The peripheral electrode pattern is created via clever geometrical arrangements of the three ingredients already present in the substrate design: conductive silver-frit regions, resistive ITO regions, and insulating bare-substrate regions. Furthermore, to control manufacturing costs, the resistive ITO coating in the peripheral electrode region is created in the same manufacturing step and with the same nominal electronic characteristics as in the region in where X and Y voltage gradients are generated. An example is the electrode design given in FIG. 1C herein, reproduced from U.S. Pat. No. 5,045,644 to Dunthorn, fully incorporated herein by reference thereto as if repeated verbatim immediately hereinafter. Such electrode designs that only use the above mentioned materials play a key role in state-of-the-art 5-wire touchscreen technology.

A quality 5-wire touchscreen will generate (X,Y) coordinates that accurately correspond to the position where the finger or stylus activates the touchscreen. This touch-position performance is largely determined by the "linearity" of the touchscreen. In the ITO coating within the touch region of an ideally linear touchscreen, the contours of equal voltage, i.e. equipotential lines, are equally spaced straight lines orthogonal to the X or Y coordinate being measured. Deviations from ideal linearity occur in practice. The design of the peripheral electrode pattern may not be fully optimized. More fundamentally, manufacturing variations in the uniformity of the ITO coating cause deviations from ideal linearity. A central problem for 5-wire resistive technology is to find the most cost-effective way to achieve sufficient linearity to meet marketplace demands for touch position accuracy.

One approach is to insist on tight manufacturing tolerances for the uniformity of the resistivity of the ITO coating. This assures quality product performance but has the disadvantage of driving up the cost of the ITO coating process.

Another approach is to design the peripheral electrode patterns to be more tolerant to variations in ITO resistivity. This approach generally leads to increased current draw through the electrode pattern. This is undesirable in many applications as it places greater power demands on the associated controller electronics. This approach may also lead to an increased width of the peripheral electrode pattern. This is also a major disadvantage for many applications.

Therefore, what is needed and what has been invented is an electrographic touch sensor and method which compensate for batch-to-batch variations in the semiconducting resistive layer and for the limitations of the in-place electrodes. What has been more particularly invented is a resistive touch sensor (i.e., a position touch sensor) and method for controlling the flow of current through a resistive layer for converting physical position information on the resistive layer into electrical signals by modifying the resistance characteristics of the resistive layer.

BRIEF SUMMARY OF THE INVENTION

The present invention accomplishes its desired objects by broadly providing a position touch sensor comprising a resistive surface (i.e., an impedance surface) having resistive perimeter edges; and at least one pair of electrodes disposed on, and electrically connected to, the resistive surface. The resistive layer is preferably adherently deposited or disposed on a substrate. The position touch sensor further includes at least one pair of spaced electrode segments to provide generally opposed boundaries for defining an overlapped resistive region between the spaced electrode segments. The resistive surface has at least one insulating region (e.g., a void, an insulating segment or channel, etc.) commencing from a resistive point in the resistive surface exterior to the overlapped resistive region and terminating in the overlapped resistive region.

The present invention further accomplishes its desired objects by also broadly providing a method of modifying the resistance characteristics of a resistive layer between a pair of parallel electrode segments of a position touch sensor comprising the steps of:

a) providing a position touch sensor comprising a substrate having adherently deposited thereon a resistive layer having a resistive portion, and at least one pair of generally parallel spaced electrode segments positioned on, and electrically connected to, the resistive layer and including an overlapped resistive region between the generally parallel spaced electrode segments and integrally contained within the resistive layer such that the overlapped resistive region includes the resistive portion with the overlapped resistive region indiscreetly merging with an external resistive region outside of the overlapped resistive region and integrally contained within the resistive layer such that the external resistive region includes the resistive portion; and b) altering the resistive portion of the overlapped resistive region and of the external resistive region.

The present invention also further accomplishes its desired objects by also further broadly providing a method for controlling the flow of current through a resistive layer for converting physical position information on the resistive layer into electrical signals comprising the steps of:

a) providing a resistive layer for converting physical position information thereon into electrical signals;

b) determining through the use of electrical excitation in the resistive layer a dimension of a length of a generally continuous resistive section which is to be located in the resistive layer of step (a);

c) disposing a first insulating region in the resistive layer of step (a) to form a first boundary of the generally continuous resistive section; and d) disposing, at a distance from the first insulating region essentially equaling the dimension of step (b), a second insulating region in the resistive layer of step (a) to form a second boundary of the generally continuous resistive section such that current may be conducted through the generally continuous resistive section between the first insulating region and the second insulating region.

It is therefore an object of the present invention to provide a position touch sensor.

It is another object of the present invention to provide a method of modifying the resistance characteristics of a resistive layer between a pair of parallel electrode segments of a position touch sensor.

It is also another object of the present invention to provide a method for controlling the flow of current through a resistive layer for converting physical position information on the resistive layer into electrical signals.

These, together with the various ancillary objects and features which will become apparent to those skilled in the art as the following description proceeds, are attained by these novel touch sensitive screens and methods, a preferred embodiment thereof shown with reference to the accompanying drawings, by way of example only, wherein:

BRIEF DESCRIPTION OF THE DRAWING(S)

Figure 6C:
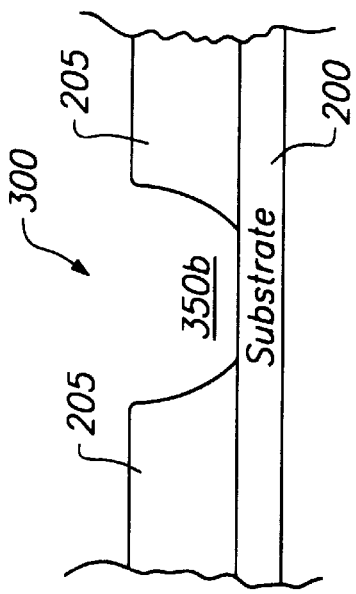
Figure 6B:
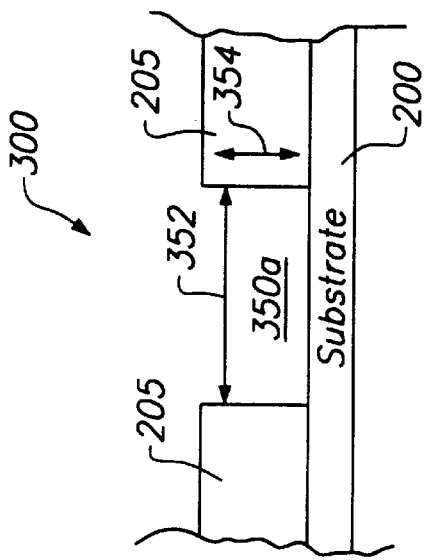
Figure 7:
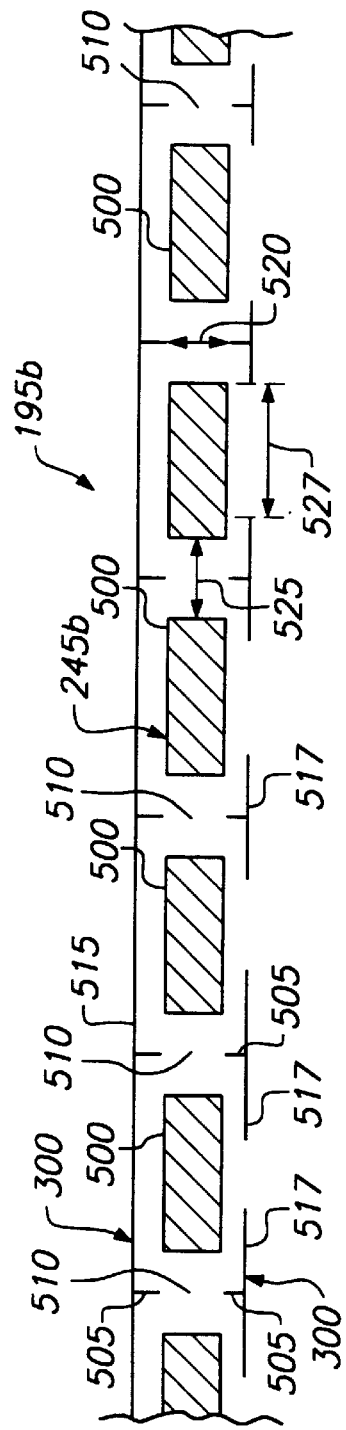
Figure 10:
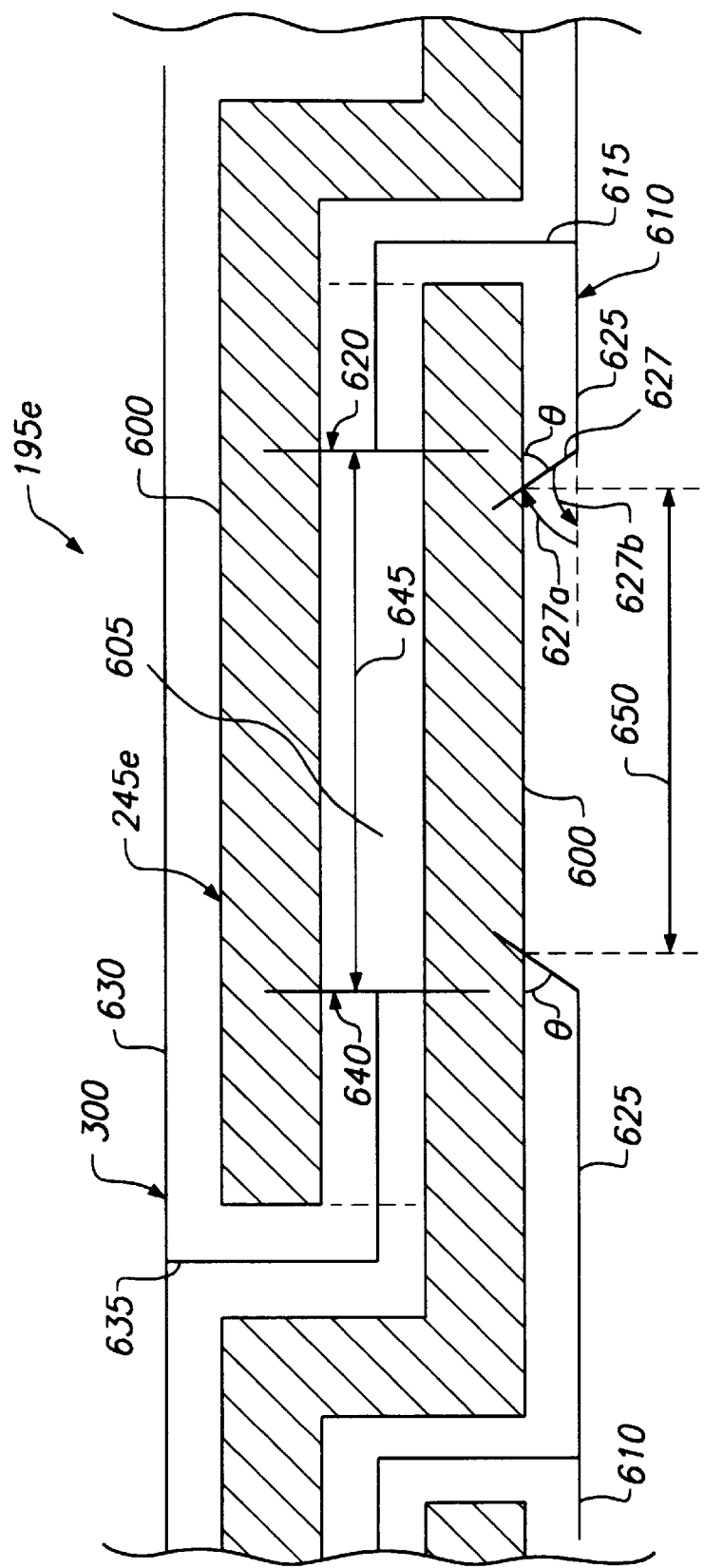
Figure 11:
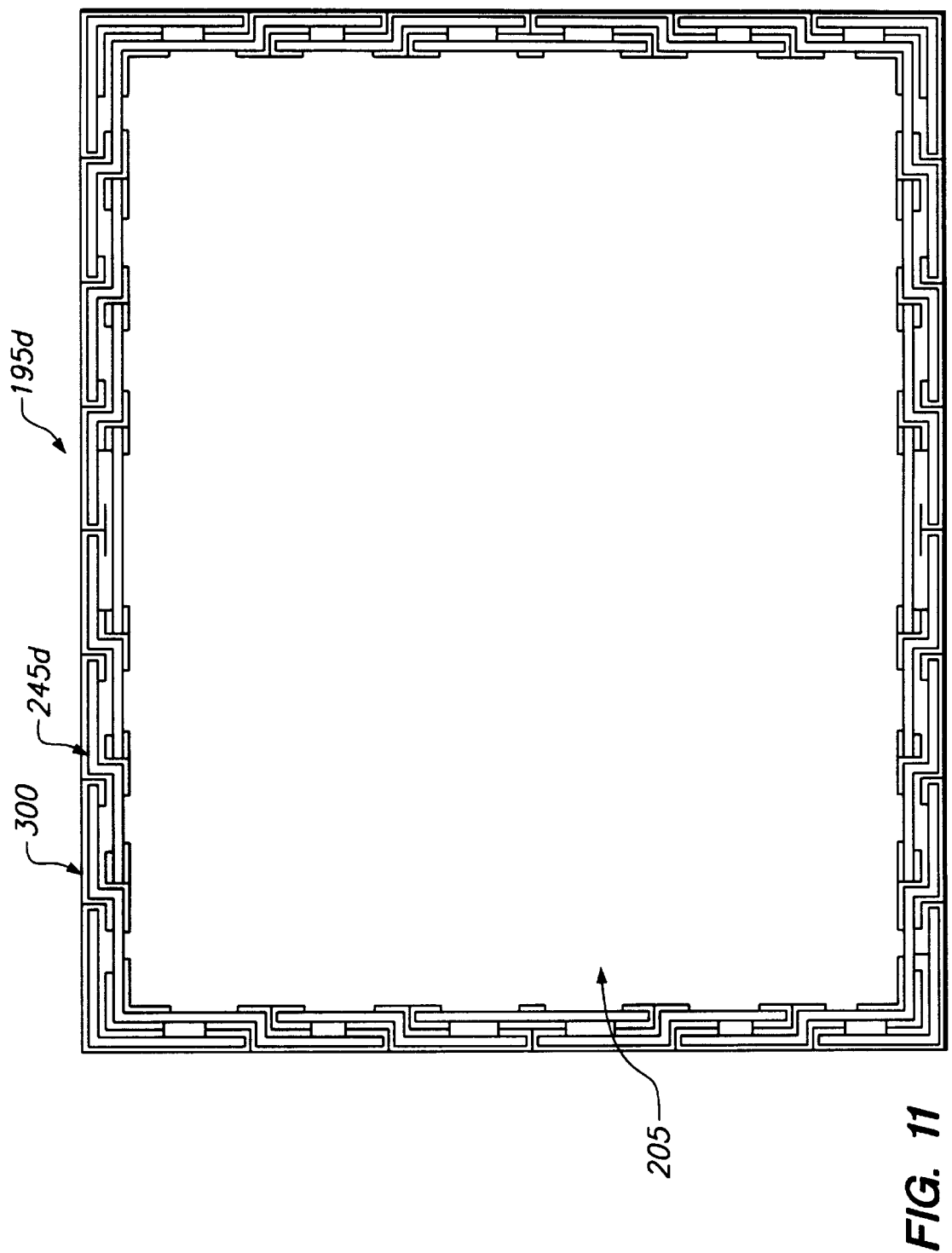
Figure 12:
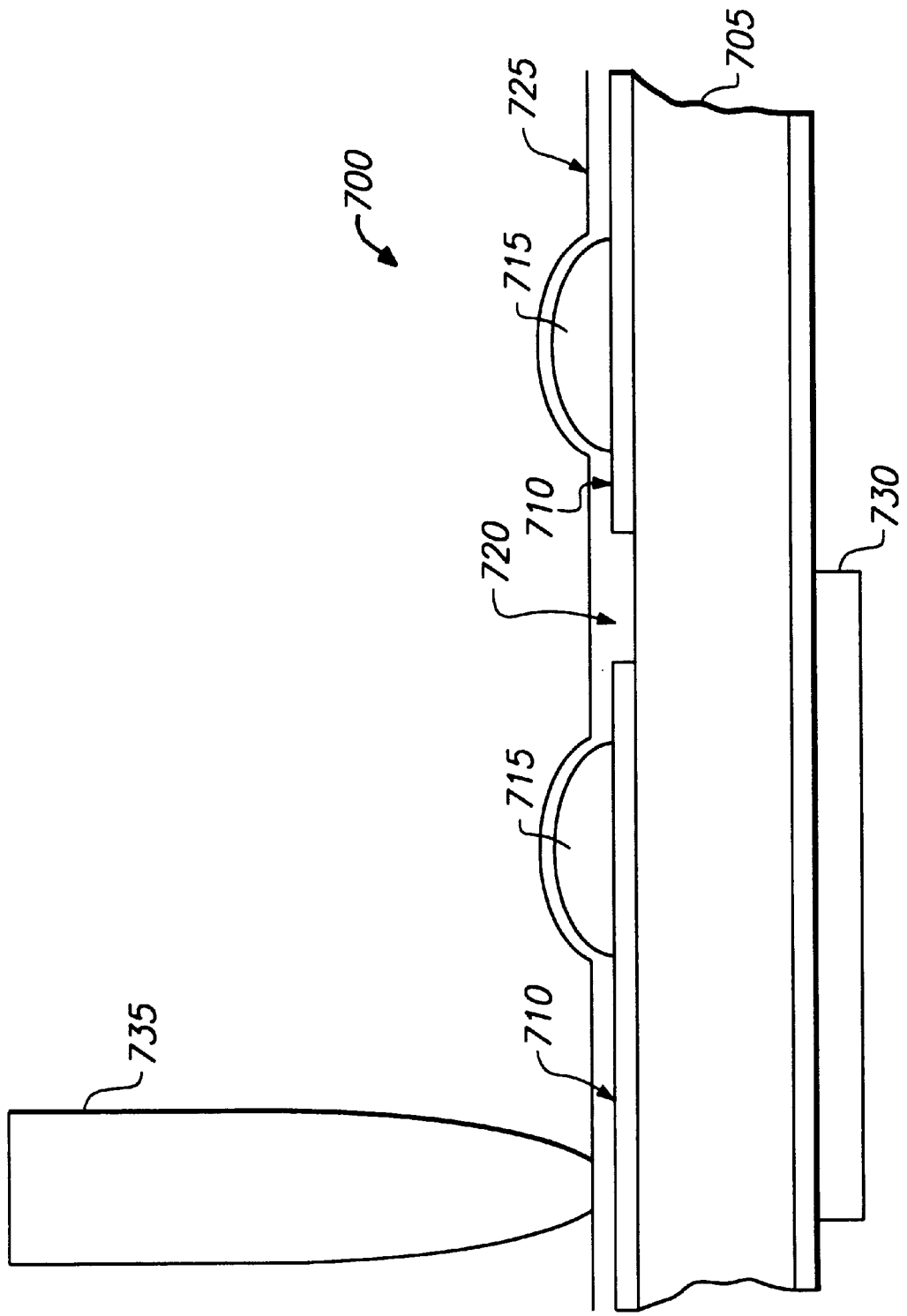

FIG. 6 is a top plan view of a portion of a gradient sheet having a resistor chain comprising overlapping conductive strips with a conductive lead coupling a T-shaped electrode to one of the conductive strips and including an insulating region having an insulating region portion extending into and terminating in an overlapped resistive region between the overlapping conductive strips and communicating with another insulating region portion which extends outside of the overlapped resistive region;

FIG. 6A is a top plan view of another embodiment of the FIG. 6 gradient sheet including the resistor chain and the insulating region;

FIG. 6B is a partial vertical sectional view of a gradient sheet including a substrate supporting a semiconductive resistive layer which has been altered by the formation of a channel therein to provide an insulating zone in the semiconductive resistive layer;

FIG. 6C is a partial vertical sectional view of a gradient sheet including a substrate supporting a semiconductive resistive layer which has been altered by the formation of another channel therein to provide another insulating zone in the semiconductive resistive layer;

FIG. 7 is a top plan view of a portion of a gradient sheet having a resistor chain comprising a plurality of conductive strips serially disposed in proximity to an edge of the gradient sheet with any two contiguous conductive strips spaced by an overlapped resistive region and having a pair of opposed insulating region portions extending into and terminating in the overlapped resistive region with the pair of opposed insulation region portions each communicating with an insulating region outside of the overlapped resistive region;

FIG. 8 is a top plan view of a portion of a gradient sheet having a resistor chain comprising overlapping conductive strips having an overlapped resistive region between conductive strips and including T-shaped insulating regions partly disposed outside of the overlapped resistive region and partly extending into and terminating in the overlapped resistive region with the portion of the T-shaped insulating region extending into the overlapped resistive region having an insulating subsection which is generally parallel to the overlapping conductive strips;

FIG. 9 is a top plan view of another embodiment of the FIG. 8 gradient sheet but with the insulating subsection communicating with another insulating subsection which is generally normal thereto and terminating in and contacting two contiguous opposed overlapping conductive strips within the overlapped resistive region and with the portion of the T-shaped insulating region disposed outside of the overlapped resistive region terminating in and making contact with the same two opposed contiguous overlapping conductive strips outside of the overlapped resistive region;

FIG. 10 is a top plan view of another embodiment of the FIG. 9 gradient sheet with the other insulating subsection overlapping the two opposed contiguous overlapping conductive strips within the overlapped resistive region and with the T-shaped insulating region disposed outside of the overlapped resistive region overlapping the two opposed contiguous overlapping conductive strips at an angle thereto;

FIG. 11 is a top plan view of a gradient sheet having the resistor chain and insulating region of FIG. 9 thereon; and FIG. 12 is a schematic side elevational view of a capacitive (AC resistive) embodiment of the touchscreen of the present invention having a substrate covered by a resistive layer upon which are a plurality of conductive electrodes, all of which in turn are covered by a dielectric layer, with a portion of the resistive layer having been removed to form an insulating zone.

DETAILED DESCRIPTION OF THE INVENTION

Figure 1A:
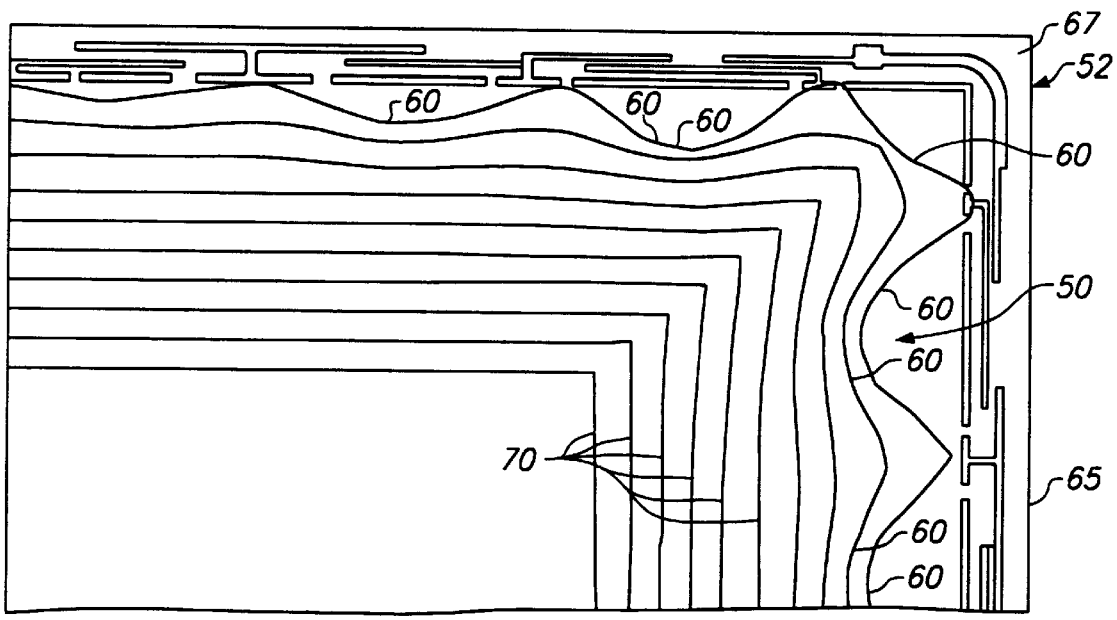
FIG. 1A is a drawing illustrating a "ruler line plot" as obtained using the gradient sheet of a conventional touchscreen.
Figure 1B:
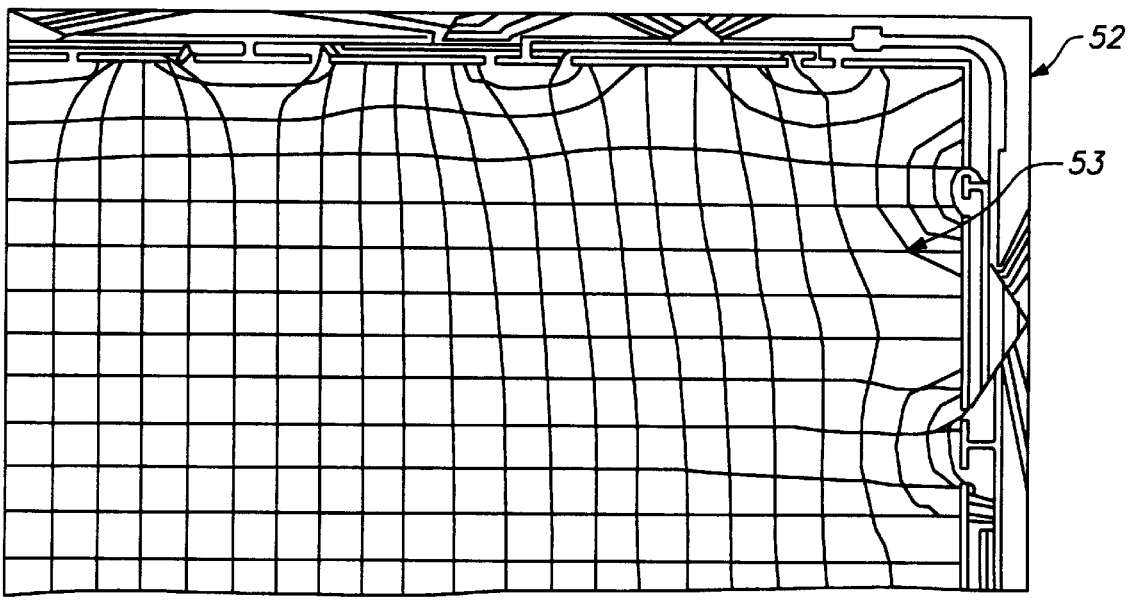
FIG. 1B is a drawing illustrating the equipotential lines as obtained using the gradient sheet of a conventional touchscreen.
Figure 1C:
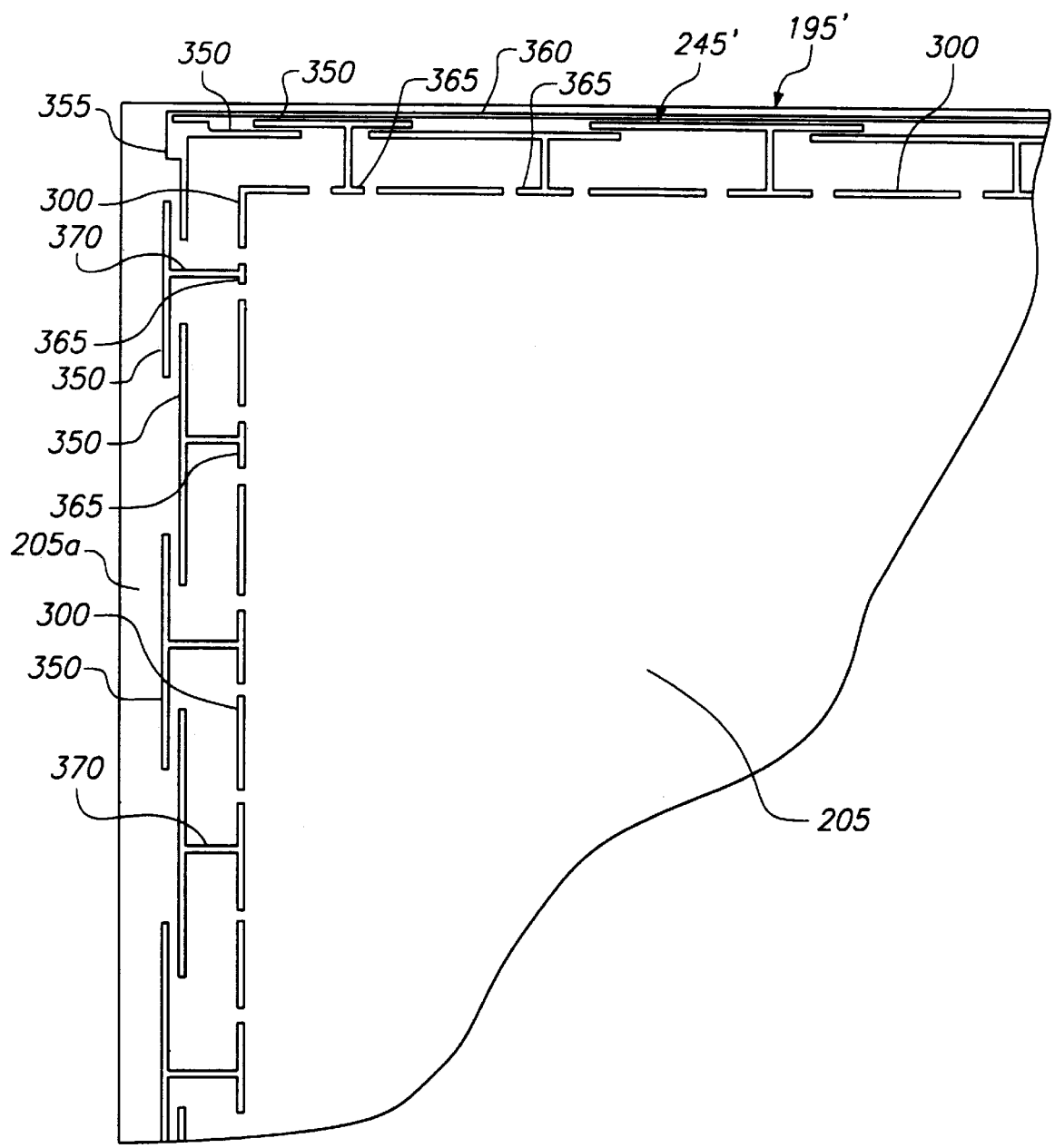
FIG. 1C is a top elevational view of another conventional gradient sheet having a plurality of overlapping conductive strips communicating with a plurality of T-shaped electrodes or "tees" wherein any two contiguous T-shaped electrodes are separated by elongated regions which are aligned with the base of the T-shaped electrodes and produced by no deposit of resistive material on the substrate.

Referring in detail now to the drawings wherein similar parts of the present invention are identified by like reference numerals, and initially referencing FIGS. 1A–2B as a preamble for better understanding the need for the present invention, there is seen in FIGS. 1A–2B various prior art gradient sheets which are intended to reduce the curvature (i.e., "bow") produced by the voltage drop along a resistor network attached to resistive electrodes in a direction perpendicular to the applied voltages. The performance of any touch sensitive screen can be demonstrated with what is known as a "ruler line plot," which is what a rectangular set of lines would look like if impressed upon the sensor, and an "equipotential line plot" showing the location of equal potentials on the sensor. For example and as best described in U.S. Pat. No. 5,045,644 to Dunthorn and assigned to the assignee of this application, and fully incorporated herein by reference thereto as if repeated verbatim, FIG. 1A shows a ruler line plot 50 on the gradient sheet 52 of the sensor, while FIG. 1B shows an equipotential line plot 55 on the gradient sheet 52, both of which are typical line plots in prior art touch sensitive sensors. These line plots shown, typically, represent each 0.1 volt differences. It can be seen that there is substantial ripple 60 along the edges 65 of the gradient sheet 52, and particularly in regions near the corner 67. Accordingly, it can be seen that the ruler line plot 50 only has straight lines 70 at a significant distance from the edges 65. The area of straight lines 70 defines the linear portion of the gradient sheet 52 of the sensor.

U.S. Pat. No. 5,045,644 to Dunthorn also discloses another prior art gradient sheet, represented in FIG. 1C as a top elevational view, illustrating a gradient sheet 195' having a central uniform resistive layer 205 of, for example, two hundred ohms per square. Positioned along each edge of the surface of the gradient sheet 195' is a resistor chain 245'. A series of overlapping conductive strips 350 form the resistor chain 245'. Using these overlapping conductive strips 350 and the resistivity of the resistive layer 205, the specific resistances of the resistor chain 245' can be tailored for the particular application and distribution of voltages along the edges of the gradient sheet 195'. The conductive strips 350 are physically attached to the resistive surface 205 by depositing a conductive material, e.g., silver frit, in the appropriate pattern. A conductive corner tab 355 applies a voltage to the end of the resistor chain 245', and a conductive lead 360 typically connects the conductive corner tab 355 to a tab (not shown) at another location of the gradient sheet 195'. This connection between the conductive corner tabs can be made external to the gradient sheet 195'. The conductive corner tab 355 is connected to appropriate external circuitry for supplying the voltage source.

U.S. Pat. No. 5,045,644 to Dunthorn further discloses a plurality of T-shaped electrodes (or "tees") 365 spaced along the edges of the resistive layer 205. A conductive lead 370 connects a T-shaped electrode 365 to the resistor chain 245'. The position of these conductive leads 370 along the resistor chains 245' is selected to provide the appropriate reference voltage to the T-shaped electrodes 365. The length and spacing of the T-shaped electrodes 365 are chosen to compensate for any cumulative voltage drop along the resistor chain 245' portion which is perpendicular to the current flow on the resistive layer 205. Elongated regions 300 of high resistance, produced by no deposit of the resistive layer 205 on the gradient sheet 195', are aligned with and interspersed between the base of the T-shaped electrodes 365. This substantially isolates the main portion of the resistive layer 205 from that portion 205*a* in the region of the resistor chains 245'. The spacings and effective lengths of the T-shaped electrodes 365 are selected to produce a voltage gradient at each T-shaped electrode 365 to compensate for any voltage drop which occurs along the resistor chain 245'.

Figure 2A:
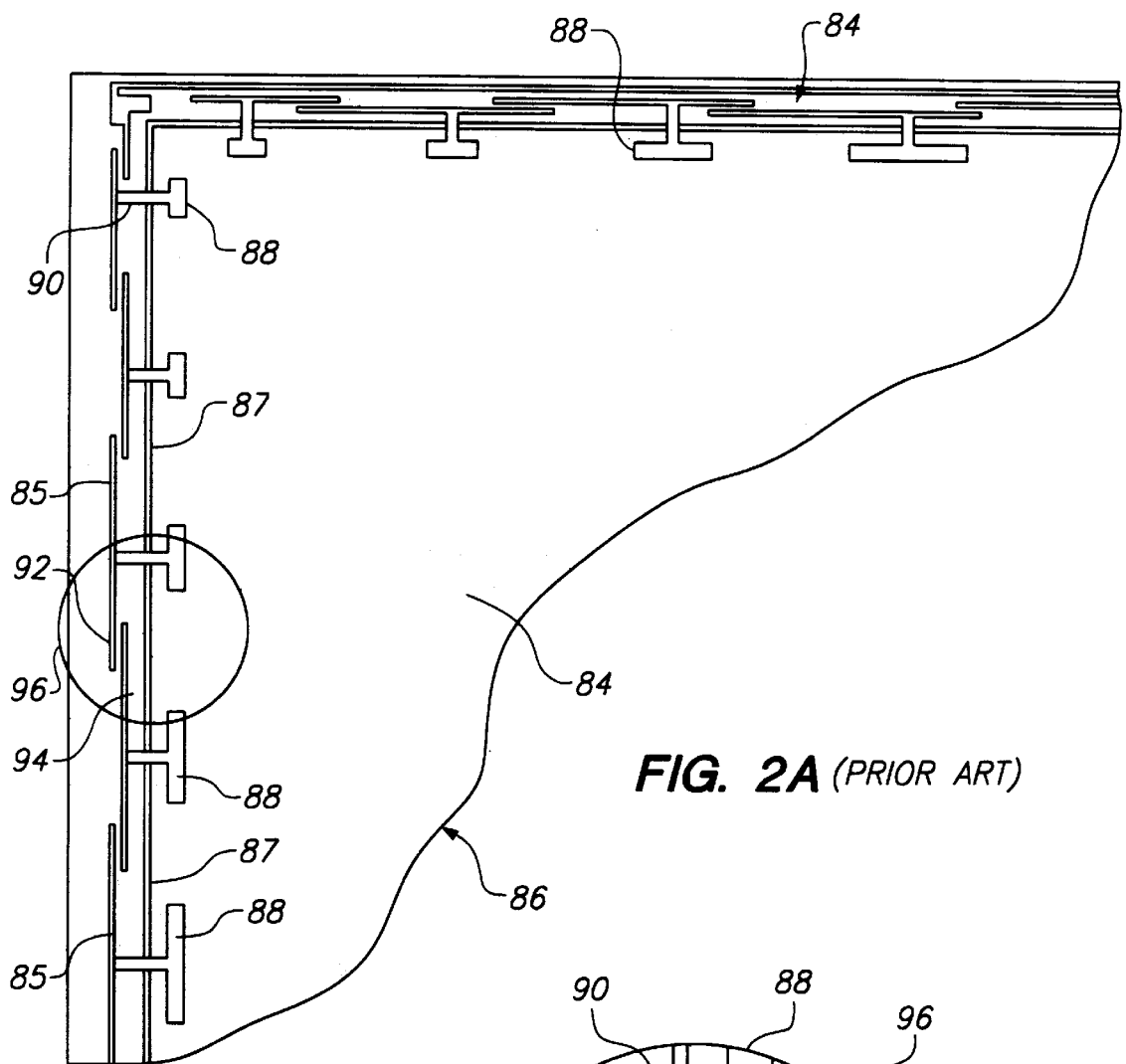
FIG. 2A is a top elevational view of another conventional gradient sheet having a resistive element/electrode configuration to reduce bow equipotential field lines therein.
Figure 2B:
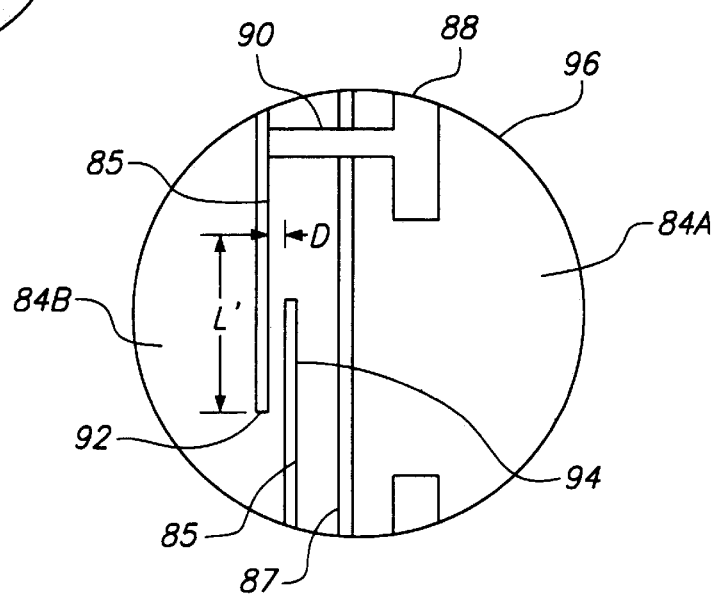
FIG. 2B is a partial top elevational view which illustrates the spacing of the resistance elements/electrodes shown in FIG. 2A.

Referring now to FIGS. 2A and 2B which illustrate a prior art gradient sheet from U.S. Pat. No. 4,822,957 to Talmage et al. and assigned to the assignee of this application, and fully incorporated herein by reference thereto, there are seen in FIGS. 2A and 2B conductive electrodes 85 positioned along the edges of a resistive layer 84 of the gradient sheet 86. Additional conductive electrodes 88 are positioned along each edge, with each electrode 88 being joined to an adjacent conductive electrode 85 with a conductive connector or lead 90. The spacing and effective lengths of the electrodes 88 are selected to produce a voltage gradient at each electrode 88 to compensate for any voltage drop that occurs along the resistance elements between conductive electrodes 85. A pair of overlapping conductive legs 92, 94 overlap a length, L', and are spaced apart a distance D (see FIG. 2B). The resistance produced at each overlap between conductive electrodes 85 is a function of the spacing, D, the overlapped length, L', and the resistivity of the resistive layer 84. Talmage et al. teach that there is no critical location for the connection between the conductive electrode 85 and an electrode lead 90 as long as the resistance value of each conductive electrode 85 is sufficiently low. Fine tuning of the resistance value of each overlap between conductive electrodes 85 can be achieved by shortening or lengthening one or both of the conductive legs 92, 94 to change the overlapped length, L'. This can be accomplished within a few days by changing the artwork used for screen printing techniques. To prevent undesirable current flow between the conductive electrodes 85 and the conductive electrodes 88, a line 87 of discontinuity is formed between the conductive electrodes 85 and 88. Line 87 is where there is no resistive layer 84 and represents a discontinuity in the resistive layer 84. Line 87 produces a central resistive area 84A and a peripheral resistive area 84B, and is taught in U.S. Pat. No. 4,822,957 to Talmage et al. as being formed by either not depositing any resistive coating (i.e., the resistive layer 84) along line 87 or removing the resistive coating after application. In either case conductive connectors 90 span or bridge line 87 so as to connect the conductive electrodes 88 to the conductive electrodes 85. Line 87 is placed on the substrate (i.e., the gradient sheet 86) before the placement of the conductive electrodes 85 and the conductive electrode 88 on the resistive layer 84 and does not serve to determine the resistance value of the overlapped region between the overlapping conductive legs 92 and 94 of the conductive electrodes 85, but rather serves to isolate this overlapped region from central resistive area 84A.

Figure 3:
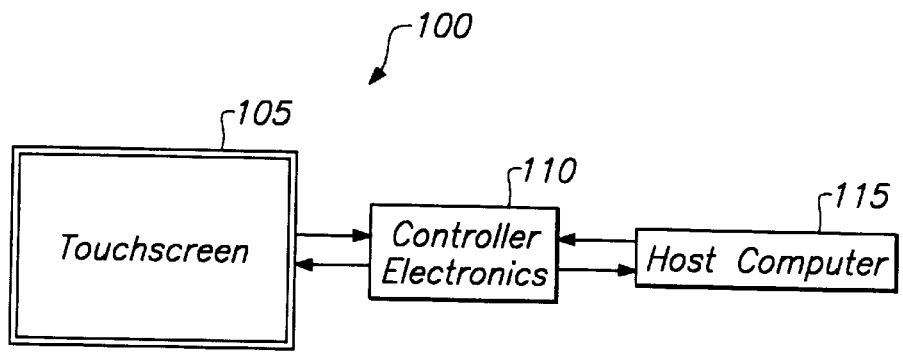
FIG. 3 is a schematic diagram of a resistive touchscreen system.

Referring in detail now to FIGS. 3–12 of the drawings for preferred embodiments of the present invention, in FIG. 3 there is seen a generalized system diagram of a resistive touchscreen system, generally illustrated as 100, which is capable of implementing the present invention. The resistive touchscreen system 100 includes a touchscreen 105 which is coupled via controller electronics 110 to a host computer 115. Generally, the controller electronics 110 receives from the touchscreen 105 analog signals carrying touch information. The controller electronics 110 also sends to the touchscreen 105 excitation signals. Specifically, the controller electronics 110 applies a voltage gradient across a resistive layer 205 (see FIG. 5) which is disposed on a substrate 200 (see FIG. 5) of the touchscreen 105. The voltages at the point of contact are the analog representations of the position touched. The controller electronics 110 digitizes these voltages and transmits these digitized signals, or touch information in digital form based on these digitized signals, to the host computer 115 for processing.

Figure 4:
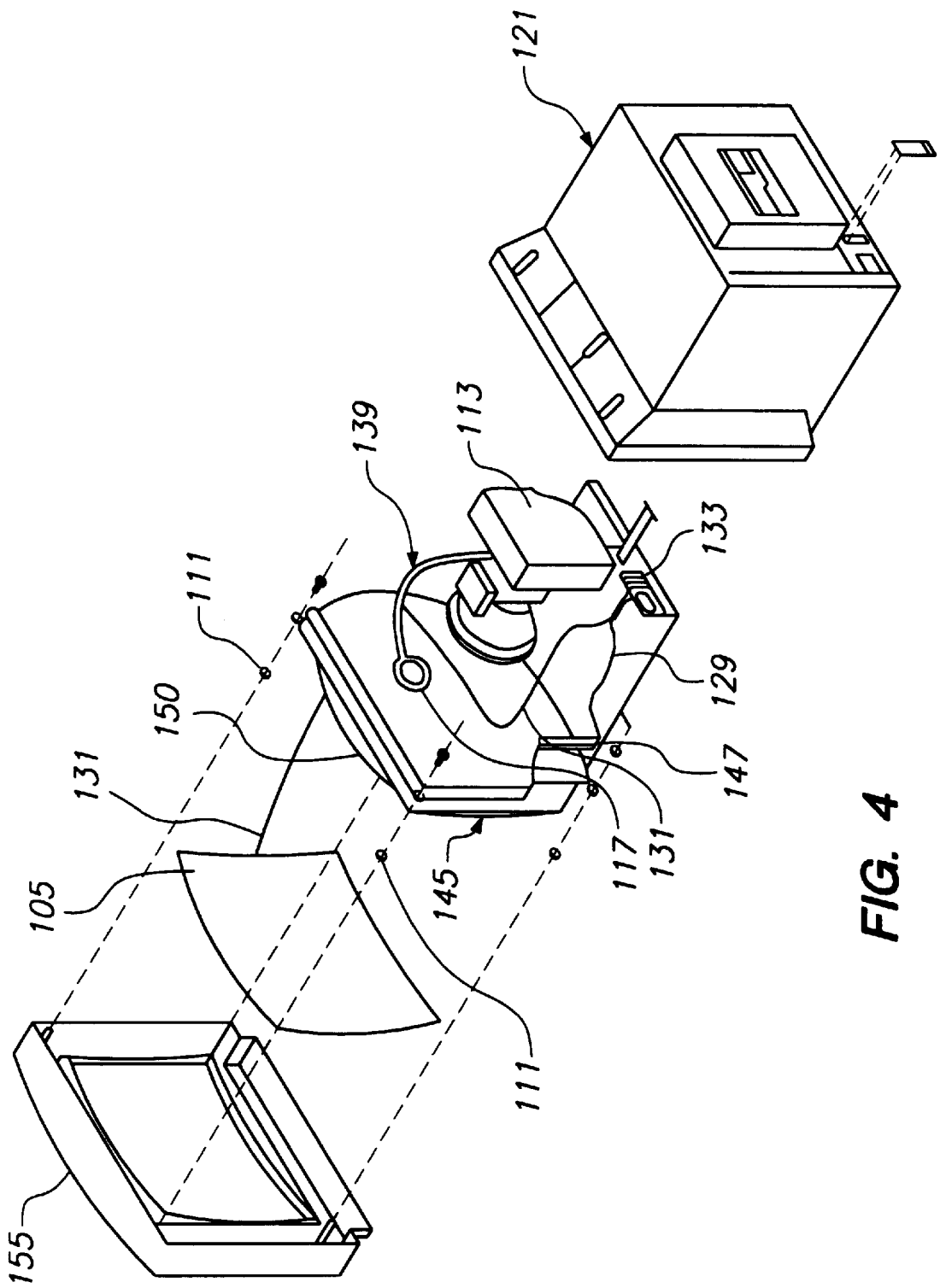
FIG. 4 is a perspective view of a cathode ray tube (CRT) device incorporating the resistive touchscreen system of FIG. 3.

As best shown in FIG. 4, the touchscreen 105 of the present invention may be installed in a conventional display device 145. The touchscreen 105 is placed in front of the cathode ray tube (CRT) face 150 of the host computer 115 and under the CRT monitor bezel 155. A plurality of spacers 111 is conveniently provided in order to create a gap for the touchscreen 105 between the CRT monitor bezel 155 and the CRT face 150. A high voltage anode 117 (not fully shown in FIG. 4) is coupled to a CRT circuit board 113 via an electrical cable 139. A touchscreen ribbon cable 131 connects from the touchscreen 105 to an outlet 133 which is to receive electrical power and which is to interfaces with controller 110 (not shown). A ground strap 129 connects from a chassis ground 147 to the outlet 133. The display device 145, along with the CRT circuit board 113 and the associated cables, are all received by a generally hollow monitor back case, generally illustrated as 121. Preferably, the components of the touchscreen 105 are substantially transparent so that the two dimensional graphics or data projected by the CRT face 150 is seen through the touchscreen 105.

As an alternative, the resistive touchscreen system 100, which incorporates the invention, may be installed in other types of display devices. For example, the touchscreen 105 may be installed with a liquid crystal display monitor or any other type of suitable display device.

The controller electronics 110 may be a separate electronics module, such as the Elo Model E271-140 AccuTouch™ controller, which may be purchased commercially from Elo TouchSystems, Inc., of Fremont, Calif. Alternatively, the controller electronics 110 may be largely embedded in the host computer 115, such as the digitizer panel interface contained in the central processing unit (CPU) chip of a handheld computer system based on the Intel386™ EX Embedded Microprocessor MHT9000 Handheld Terminal. Other controller options are also possible.

More specifically, the controller electronics 110 is capable of performing various functions. For example, the controller electronics 110 may excite the electrode pattern and measure the voltage on the cover sheet 210 (see FIG. 5) of the touch screen 105. This function is performed by the Elo Model E271-140 AccuTouch™ controller, which is commercially available from the previously mentioned Elo TouchSystems, Inc. Alternatively, the controller electronics 110 may connect the cover sheet 210 (see FIG. 5) to a current source, ground the four corners of the electrode pattern on the cover sheet 210, and digitize the currents for the electrode-pattern corners. As another option, the controller electronics 110 may support AC operation of the invention by driving the four electrode-pattern corners with an AC signal having a fixed voltage amplitude, replacing coversheet 210 with a thin dielectric coating 725 (FIG. 12) applied directly to resistive layer 205, and by then detecting changes in the corner currents resulting from the AC current sinking from a finger (or stylus) contact on the sensor. The controller electronics 110 performing these AC functions are also known as capacitive touchscreen controllers. The present invention improves linearity in other touchscreen systems employing other types of controller electronics.

The controller electronics 110 and/or the host computer 115 may include algorithms for correcting non-linearities in the touchscreen sensor according to the present invention. Correction of non-linearities may become important if the touchscreen is designed to consume low power and/or have narrow borders. For such algorithms, "correction coefficients" for non-linear corrections are produced and used for compensating for non-linearities. Such algorithms may be performed by a positioning determining system which is described in commonly-assigned U.S. patent application Ser. No. 08/616,851, to Wilson et al., filed Mar. 15, 1996, and titled "ALGORITHMIC COMPENSATION SYSTEM AND METHOD THEREFORE FOR A TOUCH SENSOR PANEL," fully incorporated herein by reference thereto as if repeated verbatim immediately hereinafter.

Figure 5:
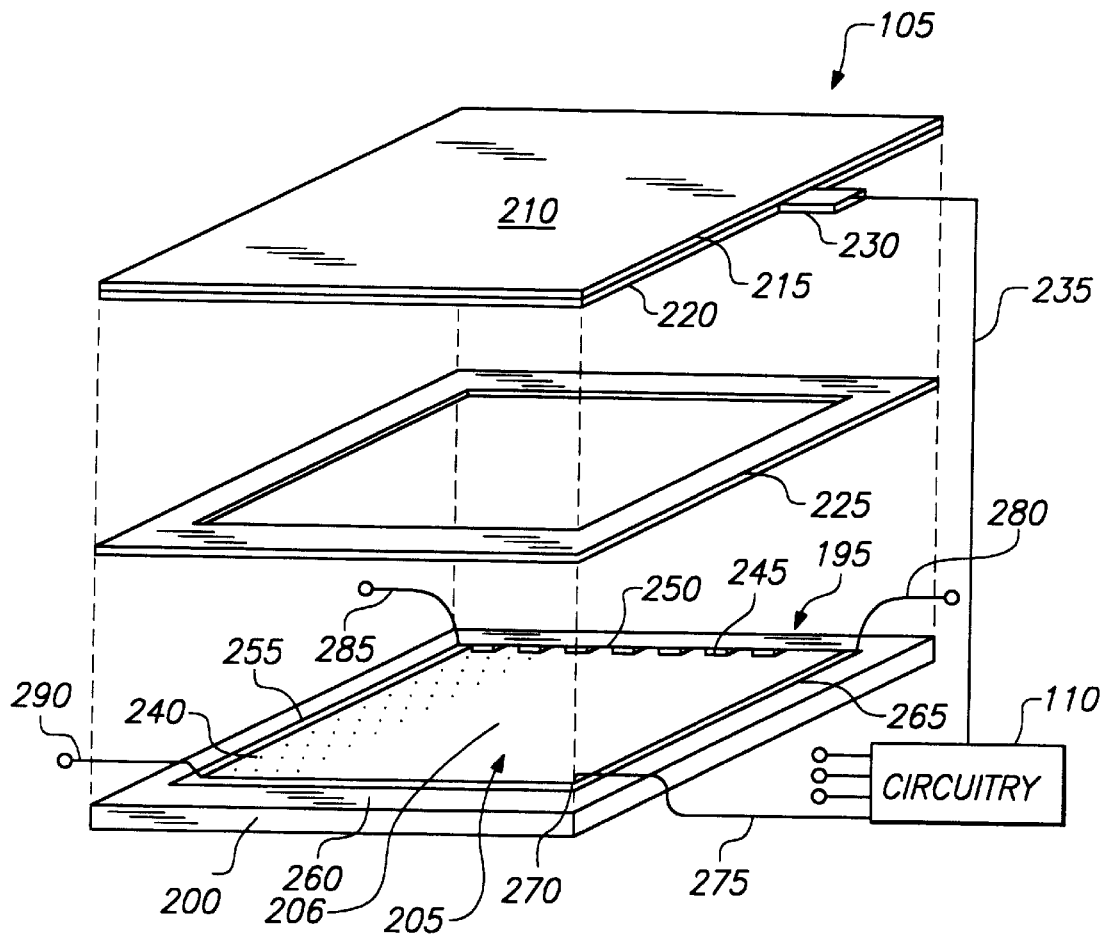
FIG. 5 is a segmented perspective view of the touchscreen of FIG. 3 incorporating the resent invention.

Referring now to FIG. 5, there is seen an exploded segmented view of the components of the touchscreen 105 in accordance with one preferred embodiment of the present invention. It will be recognized that the thickness, height, or other dimensions of some of the components in some of the drawings has been exaggerated for purposes of illustration. The touchscreen 105 comprises a gradient sheet 195 including a substrate 200 having a uniform resistive layer 205 permanently applied to one surface thereof. Preferably, the uniform resistive layer 205 has durable properties (e.g., adherent and chemically-stable properties, etc.). The resistive layer 205 further includes a touch region which is generally illustrated as 206 in FIG. 5.

The geometry of the substrate 200 may be, for example, planar (as shown in FIG. 5) or may be contoured to match the face of a curved object, such as the CRT face 150 (see FIG. 4) or other conventional video display screens. The substrate 200 can also have any perimeter configuration, e.g., rectangular (as shown) to match the configuration of a video display which would include being "substantially rectangular." The substrate 200 can also have a perimeter configuration which matches the configuration of a circular touch sensor as shown and described in U.S. Pat. No. 4,777,328 issued to Talmage Jr., et al. and fully incorporated herein by reference thereto as if repeated verbatim immediately hereinafter. Typically, a substrate 200 constructed from glass will have a resistivity value in excess of about 108 ohms per square. This substrate 200 typically has a thickness of about two to three millimeters.

For a substantially transparent touch sensor, the substrate 200 may be accordingly constructed from glass, plastic, or from other substantially transparent materials. Additionally, the resistive layer 205 on the substrate 200 should also be substantially transparent (i.e., transmission of at least 60%, and preferably at least 80%). For such a substantially transparent sensor, the resistive layer 205 is typically a semiconducting metal oxide such as indium tin oxide (ITO).

Alternatively, if the resultant product is to be an opaque sensor, then the substrate 200 may be glass, rigid plastic, acrylic plastic, or various types of printed circuit board materials, or a metal having a previously applied insulating layer. Furthermore, various plastic materials for the substrate 200 can be utilized in the form of flexible sheets and supported upon a suitable hard surface material. The resistive layer 205 is typically applied by screening a resistive ink or by spraying a resistive paint upon the substrate 200. Alternatively, the resistive layer 205 may be a volume of conducting sheet such as rubber or plastic. For an opaque sensor, the resistive layer 205 may have a sheet resistivity ranging from about 10 to about 10,000 ohms per square and can be applied within a variation of uniformity of about one percent to about twenty-five percent, depending upon the positional accuracy requirement for the sensor.

Typically, the resistive layer 205, which comprises ITO, has an approximately uniform resistivity which may be a selected value ranging from about 10 to about 10,000 ohms per square. Preferably, the resistive layer 205 has a resistivity value ranging from about 100 to about 1,000 ohms per square, more preferably from about 150 to about 300 ohms per square. Typically, the thickness of the resistive layer 205 is less than a wavelength of light.

The resistive layer 205 may be other semiconducting metal oxides such as indium oxide, tantalum oxide, tin oxide, antimony oxide, or a combined layer of, e.g., antimony oxide and tin oxide. Other similar resistive layers which are adherent, chemically stable, and provide a resistance in the range of from about 100 to about 3,000 ohms per square, without excessively reducing the transparency of the sensor, are suitable. In general, nonstoichiometric oxides of metals in Groups III and IV, with metal impurities from adjoining Groups of the Periodic Table of Elements, are suitable.

Substrates having ITO resistive layers are described in more detail in U.S. Pat. No. 4,220,815, issued Sep. 2, 1980 to Gibson et al., assigned to the assignee of this application and fully incorporated herein by reference thereto as if repeated verbatim immediately hereinafter. Such ITO-coated substrates may be purchased commercially, for example, from Optical Coating Laboratory, Inc. (OCLI) of Santa Rosa, Calif., and Information Products, Inc. (IPI) of Holland, Mich.

Continuing to refer in detail to FIG. 5, spaced a small distance above the resistive layer 205 is a cover sheet 210, which is typically a flexible film 215 having a conductive coating 220 on the underside of the flexible film 215. The cover sheet 210, as shown, prevents any damage to the resistive layer 205. Typically, the flexible film 215 has a stiff and durable coating possessing a clear or anti-glare finish. The thickness of the flexible film 215 may be, for example, about 0.005 inch (0.125 mm). The flexible film 215 may be manufactured from a rigid-like plastic (such as polyester or poly-carbonate), polyvinylchloride, or an elastomeric material, or any other suitable material.

If the sensor incorporating the present invention is to be transparent, then the conductive coating 220 must also be transparent or substantially transparent. The conductive coating 220 may be, for example, a deposit of a metal such as gold-nickel. Alternatively, the conductive coating 220 may be a semiconductor such as ITO.

While the embodiment depicted in FIG. 5 utilizes the cover sheet 210, the present invention is not limited to the disclosed cover sheet for contacting the resistive layer 205. For example, any conducting element, such as a conducting stylus (not shown in FIG. 5), can be used as an alternative. This conducting stylus may be used when the resistive layer 205 is sufficiently durable as to withstand damage from such contact. As another alternative, a capacitive or resistive pickup system can be used along with a user's finger or with an appropriate probe.

As further shown in FIG. 5, the cover sheet 210 is typically joined to the remainder of the touchscreen 105 with an adhesive along its associated edges, or optionally, with an insulative adhesive frame 225 or the like. Additionally, an electrode 230 connects the conductive coating 220 of the cover sheet 210 via lead 235 to an appropriate external circuitry, such as the controller circuit 110.

Typically, the conductive coating 220 on the cover sheet 210 is separated from the resistive layer 205 by a plurality of small transparent insulator islands or dots 240, which prevent accidental contact between the conductive coating 220 and the resistive layer 205. These insulator islands are sized and spaced to control the separation distances between the conductive coating 220 and the resistive layer 205, in order to prevent inadvertent contact therebetween, and yet permit contact therebetween by a small applied pressure of a finger tip or of a small object. These insulator islands 240 may be adhered to either the coating 220 or the coating 205. These insulator islands are further shown and described in U.S. Pat. Nos. 4,220,815 and 5,220,136, all fully incorporated herein by reference thereto as if repeated verbatim immediately hereinafter.

With continuing reference to FIG. 5, a resistor chain, generally illustrated as 245, is spaced along each edge of the resistive layer 205 and is used for applying potentials to the resistive layer 205 so as to create orthogonal voltage gradients therein. As to be shown in subsequent figures, the resistor chain 245 (composed of conductive regions, insulating regions, and resistive regions) includes discrete resistance units connected in series (see, e.g., resistor chains 245a–245e in FIGS. 6–10, respectively). The resistance values of the resistor chain 245 depend partly upon the value of the resistivity of the coating which forms part of the resistor chain 245. According to a preferred embodiment of the invention, the resistivity of the coating 205 can have a value from about 100 ohms per square to about 1000 ohms per square. However, the resistance values of the resistor chain 245 may vary in accordance with design requirements. There are four resistor chains 245 in the embodiment of FIG. 5 which are more specifically labeled 250, 255, 260, and 265. The ends of each resistor chain 250, 255, 260 or 265 are joined at or near the corners of the resistive layer 205, as at corner 270. Each of the corners is provided with an electrical lead, such as electrical leads 275, 280, 285, 290, whereby the touchscreen 105 is connected to a conventional controller electronics or circuitry 110 which provides the voltage to the resistor chain 245 and which processes information from the touchscreen 105.

When the touchscreen 105 is pressed, the conductive coating 220 of the cover sheet 210 makes direct electrical contact with the resistive layer 205 on the substrate 200. For a quasi-DC resistive touchscreen, commonly referred to as a "resistive touchscreen," the cover sheet 210 can function as either a voltage sensing probe for sensing the voltage at the contacted area, or as a current injection source. When functioning as a voltage sensing probe, the cover sheet 210 serves to sample and to measure the voltage of the gradient sheet 195 at the point of contact. When functioning as a current injection source, the cover sheet 210 is connected to a current source (provided by controller electronics 110) which injects current into the resistive layer 205 of the substrate 200 when the touchscreen 105 is activated. The electrodes at the corners (e.g., at corner 270) of the substrate 200 are connected to the controller electronics 110 (as shown in FIG. 5) where current flows to virtual grounds are detected. The controller electronics 110 observes the division of the injected currents between the four corners of the substrate 200, and the sum of the currents at the four corners provides a touch detect signal. The sum of the right corner currents, divided by the injected current, represents an X-coordinate measurement. The sum of the top corner currents, divided by the injected current, represents a Y-coordinate measurement. As noted in lines 36–65 of column 4 of U.S. Pat. No. 4,293,734 of William Pepper, Jr., the measured X-coordinate and Y-coordinate are independent of the controller electronics 110 read-out scheme (because the same results are achieved if the cover sheet 210 functions as a voltage-sensing probe or as a current injection source).

The touchscreen sensor of the present invention as previously indicated is applicable to touchscreen systems having either a voltage-sensing read-out mode or a current injection read-out mode. Touch information is in the baseband for the analog signals propagating between the touchscreen 105 and the controller electronics 110. When the touchscreen 105 is excited in the X-coordinate measuring mode, the controller electronics 110 will allow several RC time constants (i.e., $\tau$=RC) to pass before digitizing the analog signals.

Referring now to FIG. 6, there is seen another embodiment of the gradient sheet, generally illustrated as 195a. The gradient sheet 195a has a central uniform resistive layer 205 (shown in FIG. 5) of, for example, two hundred ohms per square. As stated above, this resistive surface 205 can be on a suitable substrate 200 which is either transparent or opaque depending upon the particular utilization of the touch sensor. Positioned along each edge of the surface of the gradient sheet 195a is the resistor chain 245a. A series of overlapping conductive strips 400 form the resistor chain 245a. Using these overlapping conductive strips 400 and the resistivity of the resistive layer 205, the specific resistance of the resistor chain 245a can be tailored for the particular application and distribution of voltages along the edges of the gradient sheet 195a. Typically, the conductive strips 400 are physically attached to the resistive surface 205 as by depositing a conductive material, e.g., silver, in the appropriate pattern. A conductive corner tab (not shown in FIG. 6) applies a voltage to the end of the resistor chain 245a, and a conductive lead (not shown) typically connects the conductive corner tab to a tab (not shown in FIG. 6) at another location of the gradient sheet 195a. The conductive corner tab is connected to appropriate external circuitry (as within circuitry 110) for supplying the voltage source. A portion of an overlapping conductive strip 400 is in a generally spaced relationship with at least a portion of another overlapping conductive strip 400 to produce an overlapped resistive region 402. Thus, at least one pair of spaced conductive strips 400 provide generally opposed boundaries for defining the overlapped resistive region 402 between the spaced conductive strips 400.

At least a portion of one of the strips 400 is parallel or generally parallel to at least a portion of another strip 400. Additionally, the overlapping conductive strips 400 are positioned on and electrically connected to the resistive layer 205 (shown generally in FIG. 5) of the gradient sheet 195a.

A conductive lead 405 connects a T-shaped electrode 410 to an overlapping conductive strip 400. The conductive leads 405, along the resistor chain 245a, provides the appropriate reference voltage to the T-shaped electrodes 410. The length and spacing of the T-shaped electrodes 410 are chosen to compensate for any cumulative voltage drop along the resistor chain 245a portion which is perpendicular to the current flow on the resistive layer 205. Stated alternatively, the spacings and effective lengths of the T-shaped electrodes 410 are selected to produce a voltage gradient at each T-shaped electrode to compensate for any voltage drop that occurs along the resistor chain 245a. The overlapping conductive strips 400, the conductive leads 405, and the T-shaped electrodes 410 each has, for example, a width of about 0.5 mm, and all are formed, for example, by screen printing and curing silver frit in the desired pattern.

As shown in FIG. 6, the insulation regions 300 are formed adjacent the overlapping conductive strips 400, the conductive leads 405, and T-shaped electrodes 410. As further shown in FIG. 6, an insulating region 300 extends into and terminates in an overlapped resistive region 402 from outside of the overlapped resistive region 402. The insulation region 300 has, for example, a width of about 50 μm. According to this particular embodiment of the present invention, the insulating region 300 includes an insulating region portion 415 which extends into and terminates in an overlapped resistive region 402, and an insulating region portion 420 which is outside the overlapped resistive region 402. The overlapped resistive region 402 is generally a continuous section of the resistive layer 205. The insulating region 300 (shown in FIGS. 6–10) may vary in shape or configuration. For example, the insulating regions 300 may be formed as continuous lines (as shown in FIG. 6), dashed or discontinuous lines, spacer dots, and as other suitable shapes and sizes sufficient to control current flow on the resistive layer 205.

The overlapped resistor length (L), as indicated by the double-headed arrows 425, is defined by the distance separating an insulating region portion 415 from another insulating region portion 415 in the overlapped resistive region 402. The double-headed arrow 425 thus represents the length of a resistive region 402 which permits current flow therethrough. The separation distance or gap (G) between the overlapping conductive strips 400 is further indicated by the double-headed arrows 430. Accordingly, the resistance between two overlapping conductive strips 400 is directly proportional to the resistivity of the coating 205 (see FIG. 5) and is approximated by Equation (1).

$$R \approx \rho G/L \tag{1}$$

In Equation (1), ρ represents the resistivity value (ohms per square) of the resistive layer 205 (see FIG. 5) of the gradient sheet 195a. Equation (1) is an approximation, since the actual resistance may vary due to contact resistance and due to fringing effects at the ends of an overlapped resistive region 402. A direct measurement of the resistance R of each overlap structure can be taken by placing the leads of an ohmmeter between consecutive conductive leads 405. The width of, e.g. the conductive lead 405, may be widened to, e.g. about 2.0 mm, in order to facilitate its role as a test point.

The geometry of the insulating region portions 415 can be varied to set the value of L. Based on Equation (1), L can be varied to adjust the value of the resistance, R. If a direct resistance measurement or if the linearity data (obtained from linearity testing of the gradient sheet 195a indicates that R is too small in value, then laser ablation processes (for example) can be reprogrammed to reduce the length L, thereby increasing the value of R. By varying L, the current flow can be controlled in the overlapped resistive region. Other methods, such as numerically-controlled scribing, can be used to shape the insulation regions 300 and the insulation region portions 415.

Conversely, if a smaller value of R is desired, then a larger value of L is used to define the geometry of the insulation region portions 415. For example and as best shown in FIG. 6A, the insulating region portions 415 have been set to not extend extensively into the overlapped resistive region 402. Thus, L, as represented by double-headed arrow 425', may extend any desired fraction of the distance between the overlapped boundaries 432,432 which defines the outer boundaries of the overlapped resistive region 402. As shown above in Equation (1), R is adjustable by altering the geometry of the insulative regions 300. Thus, the overlapping resistor chain 245a becomes, in effect, a chain of adjustable potentiometers.

In addition and as shown best shown in FIGS. 6 and 6A, the resistance between a node in the resistor chain 245a and the touch region 206 of the resistive layer 205 can be likewise varied by adjusting the distance 433 through alteration of the geometry of the insulative regions 300. The double-headed arrow 433 thus represents a resistive section which permits current flow therethrough.

FIGS. 6B and 6C illustrate various amendments of the insulating region 300, as seen in a partial vertical sectional view looking in direction of the arrows and along the plane of line 315–315 in FIG. 6. As shown in the FIGS. 6B and 6C, an insulating region 300 may be formed in various ways. Referring initially to FIG. 6B, the insulating region 300 is formed by creating a channel or void 350a in the resistive layer 205 and above the substrate 200, such that a portion of the substrate 200 is exposed. The channel 350a forms an insulating zone which interrupts current flow through the resistive layer 205. Preferably, the channel 350a may be formed by removing or altering portions of the resistive layer 205 with a scribe, more preferably with a laser or any other suitable like implement. For example, low-powered, lasers may be used for control-cutting the resistive layer 205 to form the channel 350a therein. Laser ablation of ITO-coated substrate are performed by, for example, the previously mentioned Optical Coating Laboratory, Inc.

Portions of the resistive layer 205 may be removed or altered by other suitable methods, such as chemical etching, photo-etching, chemical or acid deposition, masking, mechanical etching, welding, high-photon etching, thermal etching, or other suitable etching methods. Additionally, the removal of portions of the resistive layer 205 typically requires removal of the resistive layer 205 in multiple locations of the gradient sheet 195a (see FIG. 6). The process of removal of the resistive layer 205 may be iterated if necessary.

The channel 350a may have, for example, a width of about 50 μm, as represented by the double-headed arrows 352. The height of the channel 350a is represented by the double-headed arrows 354 and is about equal to the thickness of the resistive layer 205. For example, the channel 350a may have a height of less than a wavelength of light. The shallowness of the channel depth 354 supports low cost processes for removal of the resistive layer 205.

As shown in FIG. 6C, the channel in the resistive layer 205 may be formed with different configurations, such as the channel 350b. Additionally, in FIGS. 6B and 6C the insulative characteristics of the insulating region 300 is partly dictated by the extent of the conductivity of the substrate 200. Based on the teachings of the present invention, it also follows that a dielectric or non-conducting insulative material, such as glass, can be formed in the channel of the resistive layer 205. Other types of solid, non-conductive materials which can be used as insulative material include, but are not limited to, porcelains, mica, magnesia, alumina, aluminum silicate, various high polymers (e.g., epoxies, polyethylene, polystyrene, PVC, phenolics, etc.) cellulosic materials, cellular rubber, nylon, and silicon resins. These materials may be used alone or in combination with other insulators.

FIG. 7 shows another embodiment of the gradient sheet, generally illustrated as 195b. A series of conductive strips 500 form the resistor chain 245b. In this embodiment of the present invention, the insulating region 300 includes an insulating region portion 505 which extends into an overlapped resistive region 510. Preferably, the insulating regions 300 also include an upper insulating region segment 515 and T-shaped insulating segments 517, all of which are outside of the overlapped resistive regions 510. The overlapped resistor length (L), as indicated by the double-headed arrows 520 is defined by the distance separating an insulating region portion 505 in the overlapped resistive region 510 from another insulating region portion 505 in the overlapped resistive region 510. The double-headed arrow 520 thus represents a resistive section which permits current flow therethrough. The separation distance or gap (G) between the overlapping conductive strips 500 is indicated by the double-headed arrows 525. Accordingly, the effective resistance value between the two overlapping conductive strips 500 is also approximated by Equation (1). Additionally, the resistances between nodes in the resistor chain 245b and the touch region 206 of the resistive layer 205 can be adjusted by setting a resistive section defined by the double-headed arrows 527.

The gradient sheet 195b, as shown in FIG. 7, may be applicable for predictably non-linear, low-power sensors with narrow borders. A predictably non-linear sensor is attained by use of the controller electronics 110 or driver software which would apply fixed linearity correction coefficients to compensate a reproducible non-linearity. Such driver software is implemented based on, for example, the invention shown and described in the above mentioned U.S. patent application Ser. No. 08/616,851, to Wilson et al., filed Mar. 15, 1996, and titled "ALGORITHMIC COMPENSATION SYSTEM AND METHOD THEREFOR FOR A TOUCH SENSOR PANEL." Preferably, the distances 520 and 527 are adjusted to limit the number of variable non-linear correction coefficients required. A system and method for determining the linearity correction coefficients is described in the above mentioned U.S. patent application No. 08/616,851 to Wilson et al.

Referring now to FIG. 8, there is seen another embodiment of the gradient sheet, generally illustrated as 195c. A series of conductive strips 550 and insulating regions 555, and the resistive layer 205 form the resistor chain 245c. The insulating region 300 includes an upper insulating section 555, T-shaped insulating sections 560, and corner insulative sections 565. A portion of a conductive strip 550 is in a generally spaced relationship with at least a portion of another conductive strip 550 to produce an overlapped resistive region 570. The upper insulating section 555 includes the insulating subsections 575 which extend into the overlapped resistive region 570. Similarly, a T-shaped insulating section 560 includes an insulating subsection 580, while a corner insulating section 565 includes an insulating subsection 585, wherein the insulating subsections 580 and 585 extend into a resistive region 570. The resistances of the resistor chain 245c can be adjusted by setting the values of lengths L1 and L2, as represented by the double-headed arrows 590 and 595, respectively. The length L1 is set by adjusting the geometry of the insulative subsections 575 and 580 in the overlapped resistive regions 570. The length L2 is set by adjusting the geometry of the T-shaped sections 560. The geometry of the subsections 575 and 580 and of the T-shaped sections 560 may be adjusted by, for example, laser ablation.

Reference is now made to FIG. 9 which shows another embodiment of the gradient sheet, generally shown as 195d. A series of conductive strips 600 and the overlapped resistive region 605 form the resistor chain 245d. The insulating regions 300 include a T-shaped insulating region 610 having an insulating subsection 615. The insulating subsection 615 communicates with another insulating subsection 620 which is generally normal thereto and which terminates in and contacts two opposed overlapping conductive strips 600 within the overlapped resistive region 605. A portion of the T-shaped insulating region 610 disposed outside of the overlapped resistive region 605 includes an insulating segment 625 which terminates in and makes contact with the same two opposed overlapping conductive strips 600 outside of the overlapped resistive region 605.

The insulating regions 300 further includes an insulating segment 630 which also includes an insulating segment 635 terminating in an insulating segment 640. The insulating segments 635 and 640 are typically disposed in the overlapped resistive regions 605. Additionally, the insulating segment 640 terminates in two opposed overlapping conductive strips 600. The resistances of the resistor chain 245d are adjusted by setting the lengths of resistive section widths represented by the double headed arrows 645 and 650. Because the resistive region 605 is rectangular in shape, Equation (1) more accurately predicts the resistance of the region 605, and hence simplifies the adjustment of this resistance.

Note that the resistance of the resistive region 605 is independent of any moderate registration offsets between the conductive regions 600 and the insulating regions 300.

FIG. 10 is a top plan view of another embodiment of the FIG. 9 gradient sheet, generally illustrated as 195e, and having the T-shaped insulating region 610 disposed outside of the overlapped resistive region 605. For the gradient sheet 195e, the insulating segment 625 forms an angle θ with a conductive strip 600. The angle θ value may differ for each T-shaped insulating segment 610 in the gradient sheet 195e of the same touchscreen sensor. For example, the sub-segment 627 of insulating segment 625 may be rotated in the direction of arrow 627a to increase the value of the angle θ. The sub-segment 627 may be rotated in the direction of arrow 627b to decrease the value of the angle θ. The resistances of the resistor chain 245e can be adjusted further by setting the overlapped resistor spacing (as indicated by the double-headed arrows 645), the T-shaped insulating segment 610 spacing (as indicated by the double-headed arrows 650), and by the angles θ formed by the insulating segment 625. The resistances between the touch region 206 and the resistor chain 245e will vary as a function of manufacturing variations in the offset between the conductive electrodes 600 and the insulative region 300. By varying the values of the angle θ, the rate which this effective resistance changes (as a function of the offset magnitude) is altered. Thus, adjustment of the angle θ provides a design degree of freedom for reducing sensor non-linearities caused by manufacturing offset variations. FIG. 11 shows a top level view of the gradient sheet 195d of FIG. 9. The pattern of the resistor chain 245d of FIGS. 9 and 11 simplifies the calculation of the resistances of the resistor chain 245d, minimizes the effects of manufacturing registration offsets (manufacturing variations), and facilitates a simplified iterative feedback loop which corrects the resistance values in order to compensate for material variations and/or process variations.

Referring now to FIG. 12, a capacitive (AC resistive) embodiment of a touchscreen, generally illustrated as 700, is shown according to the present invention. A substrate 705 (typically glass or plastic) includes a resistive layer 710 (typically ITO or ATO). Conductive electrodes 715 are provided and electrically connect to the resistive layer 710. Insulating regions 720 may be formed by removing portions of the resistive layer 710 by laser ablation or other suitable methods discussed above. A dielectric layer 725 is formed directly on the resistive layer 710, while a conductive (resistive) coating 730 (e.g., ITO or ATO) may be applied to the bottom of the substrate 705 as a guard electrode.

When the four corners electrodes (not shown in FIG. 12) of the substrate 705 are driven by an AC signal, a finger 735 "grounded" to a human body functions as a current sink, thereby providing an AC current path from the corner electrodes via capacitive coupling to the grounded finger 735. This mode of operation is, in effect, a "current sinking mode" wherein the four substrate corner electrodes are excited by an equal voltage level. When the grounded finger 735 is placed in mechanical contact with the dielectric layer 725, the grounded finger 735 is capacitively coupled to the resistive layer 710, and changes in the AC currents in the four substrate corner electrodes are then observed for determining the location of the touch of the grounded finger 735. The dielectric layer 725 insures that the grounded finger 735 is in close proximity with the resistive layer 710 without DC contact. Additionally, for manufacturing process control, touchscreen linearity can first be tested in a quasi-DC resistive touchscreen mode, and the insulative regions 720 are then formed or adjusted accordingly before the dielectric layer 725 is formed. The conductive coating 730 serves two functions. First, it can act as an electronic shield between the resistive layer 725 and possible electronic noise sources located adjacent the touchscreen, such as the display device. Second, if the conductive coating 730 is driven by the same AC driving signals which are applied to the four corner electrodes, then the current sinking effects of the stray capacitance between the resistive layer 710 and the surrounding environment are greatly reduced.

Continuing to refer in detail to the drawings for operation of the invention and the method for controlling the flow of current through a resistive layer for converting physical position information on the resistive layer into electrical signals, the substrate 200 is provided with the resistive layer 205 which converts physical position information thereon into electrical signals. A dimension is then determined for a length of a resistive section which is to be located in the resistive layer 205. In FIG. 6, the resistive sections (as defined by the distances 425 and 433) permit the flow of current therethrough from and through the resistor chain 245a. In FIG. 7, the resistive sections (as defined by the distances 520 and 527) permit the flow of current therethrough from and through the resistor chain 245b. In FIG. 8, the resistive sections (as defined by the distances 590 and 595) permit the flow of current therethrough from and through the resistor chain 245c. In FIGS. 9 and 10, the resistive sections (as defined by the distances 645 and 650) permit the flow of current therethrough from and through the resistor chain 245d.

The dimension for a length of a resistive section is determined through the use of electrical excitation in the resistive layer. Electrical excitation may be provided, for example, by excitation voltages or by current injection. More specifically, during the linearity testing stage, the electrical behavior of the gradient sheet 195 is tested by observing the electrical field patterns thereon. Testing of linearity, or more generally, measurement of discrepancies between desired and observed voltage gradients, during manufacture is key to realizing the advantages of the electrode patterns (i.e., resistor chains 245a–245e in FIGS. 6–10, respectively). Such linearity testing may, e.g., involve exciting the four corner electrodes at corners 270 (see FIG. 5) with "X", and then "Y", excitation voltages. For each type of excitation voltages, voltages at a rectangular grid of points, e.g. 6 by 8, are measured with a volt meter probe. Thus, with testing of this type, the electrode designs discussed above provide an ability to easily and rapidly adapt to manufacturing variations and speed design optimization.

Consider the case of a batch process. In particular, consider what happens after a lot of glass substrate has been coated with ITO and provided with the silver-frit pattern of conductive electrodes. Using the nominal design geometry for the regions of removed ITO, a small sampling from the lot, e.g. 3 substrate units, is further processed and tested for linearity. In FIG. 6, for example, the length L may have a first initial value prior to linearity testing. During linearity testing, the measured discrepancies in the voltage gradients are then used to determine desired changes to the resistance values of the resistor elements of the border electrode pattern. The geometry of the removed ITO regions is then redesigned to implement the desired changes in resistance values of the resistor chains (e.g., resistor chains 245a–245e). The resistance values of a resistor chain 245a is tuned, such that, e.g., a uniform voltage gradient gradient can be excited on the resistive layer 205 (see FIG. 5), i.e., linearity is achieved throughout the resistive layer 205. Thus, according to the present invention, the desired linearity is achieved by adjusting the resistances of the resistive region 402 of the resistor chain 245a in the gradient sheet 195a. The modified design for the geometry of the removed ITO is then used to process the remaining substrate units of the lot.

The above electrode patterns also provide similar advantages for continuous processes. By periodically testing linearity of samples from a continuous production line, the geometry of the removed-ITO regions can track drifts in the manufacturing process.

A key observation here is that programmable low-cost manufacturing processes exist for creating regions of removed ITO (insulation regions 300). These processes include, but are not limited to, laser ablation or scribing, for which a change in design geometry requires only reprogramming of numerically controlled manufacturing equipment. In contrast, the silver-frit electrode pattern of the resistor chains 245a–245e is most cost-effectively applied using a screen printing process that does not support fast modifications of silver-frit electrode geometry in response to manufacturing variations.

Algorithms used in the adaptive process of creating insulation regions 300 require quantitative information on the correlations between voltage gradient discrepancies and changes in the resistance values from alternations in removed-ITO geometry of the insulation regions 300. These correlations may be determined by computer simulations that numerically solve Poisson's equation for the boundary conditions corresponding to various modifications of the electrode design. Alternately, these correlations may be determined experimentally by observing voltage gradient discrepancies induced by alternations in removed-ITO geometry of insulation regions 300.

Such adaptive processes can compensate for batch-to-batch variations or drift in the uniformity of the ITO coating process, line width variations and other variations in the silver-frit electrode process, and other sources of variation in the manufacturing processes. By relaxing the manufacturing tolerances of these processes, manufacturing costs are reduced.

Furthermore, the easily optimized designs of the invention (including the electrode designs above) may also reduce the time to market for new products. Additionally, the invention permits cost-effective production of sensors originating from "last-minute" or customized orders. This contrasts with prior art designs for which non-linearities from the electrode pattern design, perhaps due to quantitative errors in process-dependent design parameters, are difficult to correct.

Reference is now made to FIG. 10, by way of example only, to describe the adjustment of the dimension of a length of the resistive sections (as represented by the distances 645 and/or 650). The first insulating region 610 is formed in the resistive layer 205 (see FIG. 5), while the second insulating region 630 is formed and is spaced at a distance 645 from the first insulating region 610 such that the distance 645 defines the length of a resistive section through which current may conduct. The first insulating region 610 (or the second insulating region 630) extends into an overlapped region 605 from a portion of the resistive layer 205 (see FIG. 5) which is outside the overlapped region 605.

If the length of the resistive section, as best represented by the distance 645, is to be adjusted, then the first insulating region 610 may be extended further into the overlapped region 605. This would decrease the distance 645 and thus increase the resistances of the resistor chain 245e. Alternatively, the first insulating region 610 may extend only slightly into the portion of the resistive layer 205 (see FIG. 5) which is inside the overlapped region 605. Under this alternative, the distance 645 increases and the resistance of the resistor chain 245e decreases.

In FIG. 10, the first insulating region 610 is also spaced at a distance 650 from an adjacent first insulating region 610. The distance 650 can be adjusted to further set the value of the resistance between nodes of the resistor chain 245e and the touch region 206 of the resistive layer 205. For example, by decreasing the distance 650, this resistance increases. By increasing the distance 650, this resistance decreases.

The first insulating region 610 and the second insulating region 630 (of the insulation region 300) may be formed by etching a channel 350a or 350b (see FIGS. 6B and 6C) in the resistive layer 205 (see FIGS. 6B and 6C again). Preferably, the etching of the channel 350a or 350b is performed by laser etching or ablation. Alternatively, the channel 350a or 350b (see FIGS. 6B and 6C again) may be formed by numerically-controlled scribing of the resistive layer 205 (see FIGS. 6B and 6C again).

The position touch sensor and method according to the present invention is applicable to resistive touchscreens (quasi-DC resistive touchscreens) 105, as shown in FIG. 5, and to capacitive touchscreens (AC resistive touchscreens) 700, as shown in FIG. 12.

The position touch sensor and method according to the present invention make possible the following advantages. The invention permits partial compensation for manufacturing variations in the ITO coating process, and thus ITO manufacturing tolerances can be relaxed. By relaxing the ITO manufacturing tolerances, manufacturing costs are reduced. Of interest to low-power touch system design, higher resistivity values tend to have larger manufacturing variations. Such variations can be better tolerated using the present invention. Production of ITO coatings with higher resistivity values are possible while maintaining acceptable linearity performance. ITO coatings which have higher resistivity values are desirable in low-power touch sensors which may be applicable to lap-top/notebook computers and to PDAs.

In addition, the present invention decreases yield loss and delays in manufacturing, since the resistor chains (245a to 245e) can be quickly tuned to match the characteristics of a particular ITO coating run during the manufacturing process.

From the foregoing, it will be understood by persons skilled in the art that a gradient sheet for a touch sensitive sensor has been provided that has reduced manufacturing cost and improved operating characteristics, as compared to the corresponding type of gradient sheet of the prior art. This invention further enables reduced development time for touch screen products. This gradient sheet permits achievement of position sensitive systems having increased linearity (positional accuracy). This permits the simplified fabrication of a touchscreen with good linearity. Although only certain specific embodiments are described herein, it will be recognized by persons skilled in the art that the teachings contained herein will permit the fabrication of other devices which will perform as described above. In addition, the improved gradient sheet of this invention may be used with a conventional sensing sheet and for other applications of touch sensors where various signal "pick-off" devices are utilized.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. A method for controlling the flow of current through a resistive layer for converting physical position information on the resistive layer into electrical signals comprising the steps of:
    (a) providing a resistive layer for converting physical position information thereon into electrical signals;
    (b) determining through the use of electrical excitation in the resistive layer a dimension of a length of a generally continuous resistive section which is to be located in the resistive layer of step (a);
    (c) providing a pair of generally parallel electrodes engaged to said resistive layer to produce an overlapped resistive region in said resistive layer between said pair of generally parallel electrodes;
    (d) disposing a first insulating region in the overlapped resistive region of step (c) to form a first boundary of the generally continuous resistive section;
    (e) disposing, at a distance from the first insulating region essentially equaling the dimension of step (b), a second insulating region in the overlapped resistive region of step (c) to form a second boundary of the generally continuous resistive section such that current may be conducted through the generally continuous resistive section between the first insulating region and the second insulating region and such that said generally continuous resistive section is located in said overlapped resistive region.

2. The method of claim 1, additionally comprising extending said first insulating region in the generally continuous resistive layer of step (c) towards said second insulating region to decrease the dimension of the length of the generally continuous resistive section of step (b) and to increase the resistance of said generally continuous resistive section.

3. The method of claim 1 additionally comprising extending said first insulating region around an end of one of said pair of generally parallel electrodes.

4. The method of claim 1 additionally comprising providing a plurality of generally aligned and spaced electrodes engaged to said resistive layer with a respective end of any two contiguous electrodes being separated by a resistive region.

5. The method of claim 4 wherein said disposing step (c) includes disposing said first insulating region in said resistive region and said disposing step (d) includes disposing said second insulating region in said resistive region such that said generally continuous resistive section is located in said resistive region.

6. A position touch sensor, comprising:
    a substrate;
    a resistive layer on one face of the substrate;
    a pair of electrodes, each of the electrodes positioned on and electrically connected to the resistive layer, the electrodes positioned on the substrate such that they are spaced apart and a portion of one of the electrodes extends along a portion of another one of electrodes providing a resistive region wherein the resistive region is bounded by the electrode portions at a first set of opposing sides of the resistive region and by boundaries delineated by an end of each portion of the electrodes at a second set of opposing sides;
    a first insulating region extending from outside the resistive region to a terminating end within the resistive region wherein the first insulating region extends across a first side of the second set of opposing sides; and
    a second insulating region extending from outside the resistive region to a terminating end within the resistive region across a second side of the second set of opposing sides, the second insulating region spaced apart from the first insulating region.

7. A position touch sensor as recited in claim 6, wherein the insulating region comprises a channel in the resistive layer.

8. A position touch sensor as recited in claim 7, wherein the channel is formed from the removal of a selected portion of the resistive layer.

9. A position touch sensor as recited in claim 7, wherein the channel extends from an outer surface of the resistive layer to the substrate.

10. A position touch sensor as recited in claim 6, wherein the insulating region comprises a first insulating portion extending from a side of the first electrode opposed to the second electrode to within the resistive region and a second insulating portion extending from a side of the second electrode opposed to the first electrode to within the resistive region, the first insulating portion and the second portion spaced apart within the resistive region.

11. A position touch sensor as recited in claim 10, wherein the first insulating portion comprises a segment that extends from the first electrode to the second electrode within the resistive region.

12. A position touch sensor as recited in claim 10, wherein the second insulating portion comprises a segment that extends from the first electrode to the second electrode within the resistive region.

13. A position touch sensor as recited in claim 10, wherein the first insulating portion and the second insulating portion each comprise a segment that extends from the first electrode to the second electrode within the resistive portion.

14. A position touch sensor as recited in claim 6, wherein the portion of the one electrode is generally parallel to the portion of the another one of the electrodes.

15. A position touch sensor, comprising:
    a substrate;
    a resistive layer on one face of the substrate;
    a plurality of electrodes, each of the electrodes positioned on and electrically connected to the resistive layer, each pair of adjacent electrodes positioned such that they are spaced apart and a portion of one of the pair of electrodes extends along a portion of the other of the pair of electrodes providing a resistive region; and
    an insulating region extending from outside the resistive region to a terminating end within the resistive region wherein the insulating region comprises a first insulating portion extending from a side of the first electrode opposed to the second electrode to within the resistive region and a second insulating portion extending from a side of the second electrode opposed to the first electrode to within the resistive region, the first insulating portion and the second portion spaced apart within the resistive region.

16. A position touch sensor as recited in claim 15, wherein the insulating region comprises a channel in the resistive layer.

17. A position touch sensor as recited in claim 16, wherein the channel is formed from the removal of a selected portion of the resistive layer.

18. A position touch sensor as recited in claim 16, wherein the channel extends from an outer surface of the resistive layer to the substrate.

19. A position touch sensor as recited in claim 15, wherein the resistive region is bounded by the electrode portions at a first set of opposing sides of the resistive region and by boundaries delineated by an end of each portion of the electrodes at a second set of opposing sides, the insulating region extending across a first side of the second set of opposing sides, the sensor further comprising a second insulating region extending from outside the resistive region to a terminating end within the resistive region across a second side of the second set of opposing sides, the second insulating region spaced apart from the first insulating region.

20. A position touch sensor as recited in claim 15, wherein the first insulating portion comprises a segment that extends from the first electrode to the second electrode within the resistive region.

21. A position touch sensor as recited in claim 15, wherein the second insulating portion comprises a segment that extends from the first electrode to the second electrode within the resistive region.

22. A position touch sensor as recited in claim 15, wherein the first insulating portion and the second insulating portion each comprise a segment that extends from the first electrode to the second electrode within the resistive portion.

23. A position touch sensor as recited in claim 15, wherein the portion of the one electrode is generally parallel to the portion of the another one of the electrodes.

* * * * *